United States Patent
Sawachi

(10) Patent No.: US 9,754,346 B2
(45) Date of Patent: Sep. 5, 2017

(54) STILL IMAGE GENERATION DEVICE FOR PROVIDING A FIRST AND SECOND MIXTURE OF AN IN-FOCUS IMAGE AND AN OUT-OF-FOCUS IMAGE

(71) Applicant: FUJIFILM Corporation, Tokyo (JP)

(72) Inventor: Youichi Sawachi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 20 days.

(21) Appl. No.: 14/659,885

(22) Filed: Mar. 17, 2015

(65) Prior Publication Data

US 2015/0187046 A1 Jul. 2, 2015

Related U.S. Application Data

(63) Continuation of application No. PCT/JP2013/074206, filed on Sep. 9, 2013.

(30) Foreign Application Priority Data

Sep. 18, 2012 (JP) .................. 2012-204238

(51) Int. Cl.
*G02B 7/36* (2006.01)
*G06T 3/00* (2006.01)
*H04N 5/232* (2006.01)

(52) U.S. Cl.
CPC .............. *G06T 3/0012* (2013.01); *G02B 7/36* (2013.01); *G02B 7/365* (2013.01); *G06T 3/0068* (2013.01);
(Continued)

(58) Field of Classification Search
None
See application file for complete search history.

(56) References Cited

U.S. PATENT DOCUMENTS

2008/0226148 A1* 9/2008 Gu .......................... G06T 5/007
382/128
2011/0150349 A1 6/2011 Kojima et al.
(Continued)

FOREIGN PATENT DOCUMENTS

CN 1392724 A 1/2003
JP 2000-209590 A 7/2000
(Continued)

OTHER PUBLICATIONS

Li Shutao, James T. Kwok, and Yaonan Wang. "Combination of images with diverse focuses using the spatial frequency." Information fusion 2, No. 3 (2001): 169-176.*
(Continued)

*Primary Examiner* — Xiao Wu
*Assistant Examiner* — Steven Elbinger
(74) *Attorney, Agent, or Firm* — Birch, Stewart, Kolasch & Birch, LLP

(57) ABSTRACT

A mixture ratio determiner chooses a first mixture ratio set in a case where a blur evaluation value is a reference value or more, and chooses a second mixture ratio set in a case where the blur evaluation value is less than the reference value. The second mixture ratio set has a higher mixture ratio of an in-focus image and a lower mixture ratio of an out-of-focus image than the first mixture ratio set. A mixed image generator produces a plurality of mixed images having a gradually varying mixture ratio, from the in-focus image and the out-of-focus image. A display controller sequentially displays the plurality of mixed images on a monitor in the manner of a moving image.

18 Claims, 20 Drawing Sheets

(52) U.S. Cl.
CPC .............. *H04N 5/23212* (2013.01); *G06T 2207/10004* (2013.01); *G06T 2207/10148* (2013.01)

(56) References Cited

U.S. PATENT DOCUMENTS

| | | | |
|---|---|---|---|
| 2012/0013786 A1* | 1/2012 | Yasuda | H04N 5/23219 348/349 |
| 2012/0057070 A1* | 3/2012 | Park | H04N 5/23212 348/345 |

FOREIGN PATENT DOCUMENTS

| | | |
|---|---|---|
| JP | 2002-290831 A | 10/2002 |
| JP | 2009-81786 A | 4/2009 |
| JP | 2010-16671 A | 1/2010 |

OTHER PUBLICATIONS

International Search Report issued in PCT/JP2013/074206, dated Oct. 15, 2013.
Office Action dated Mar. 20, 2017 in corresponding Chinese Patent Application No. 201380048514.8 with an English Translation.

* cited by examiner

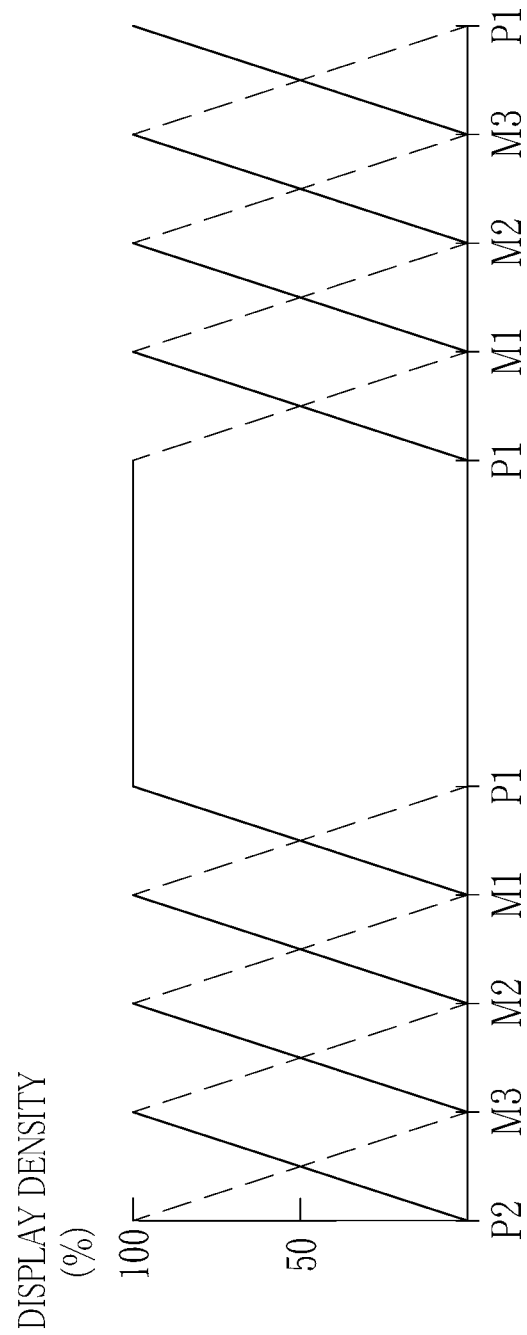

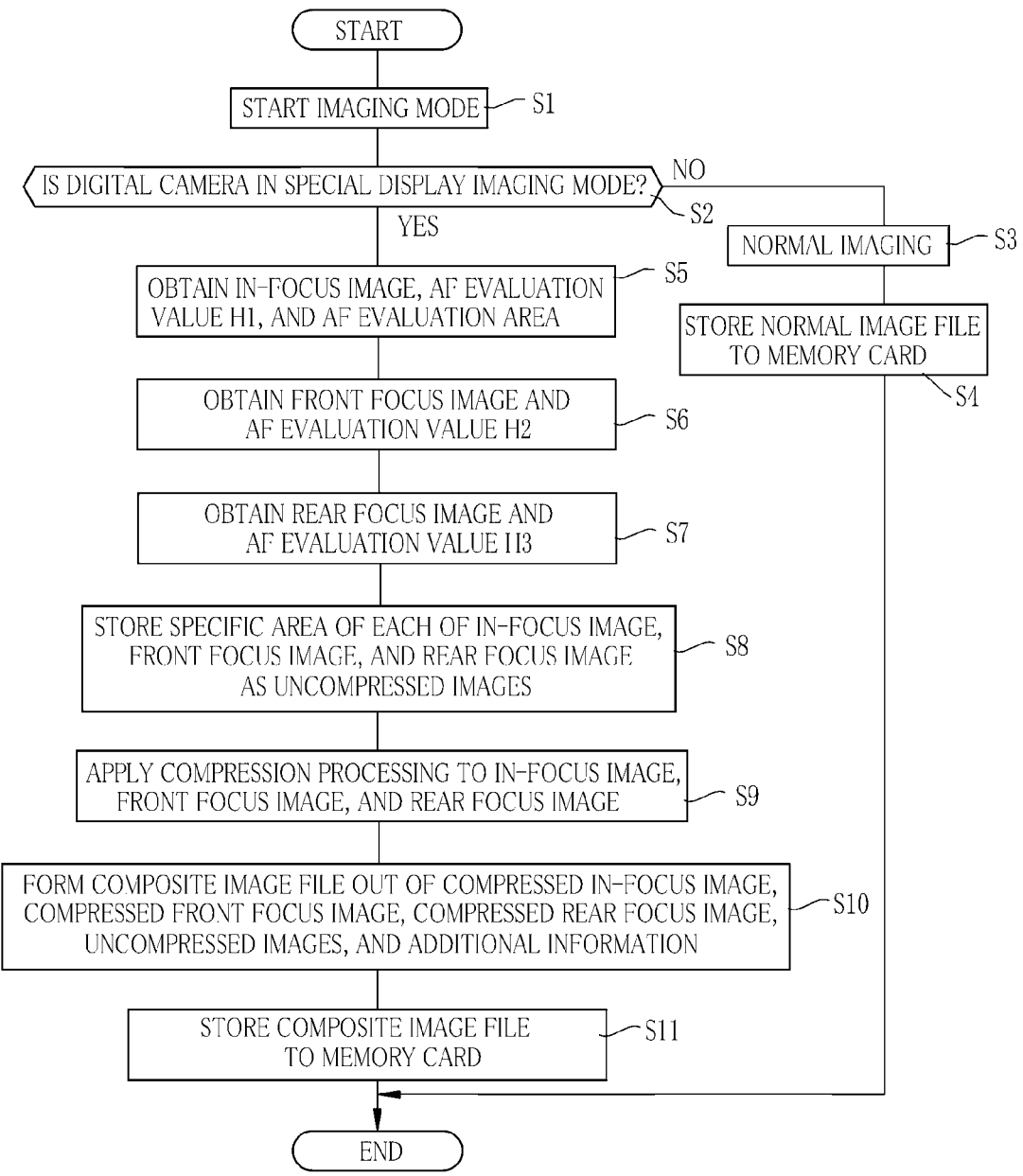

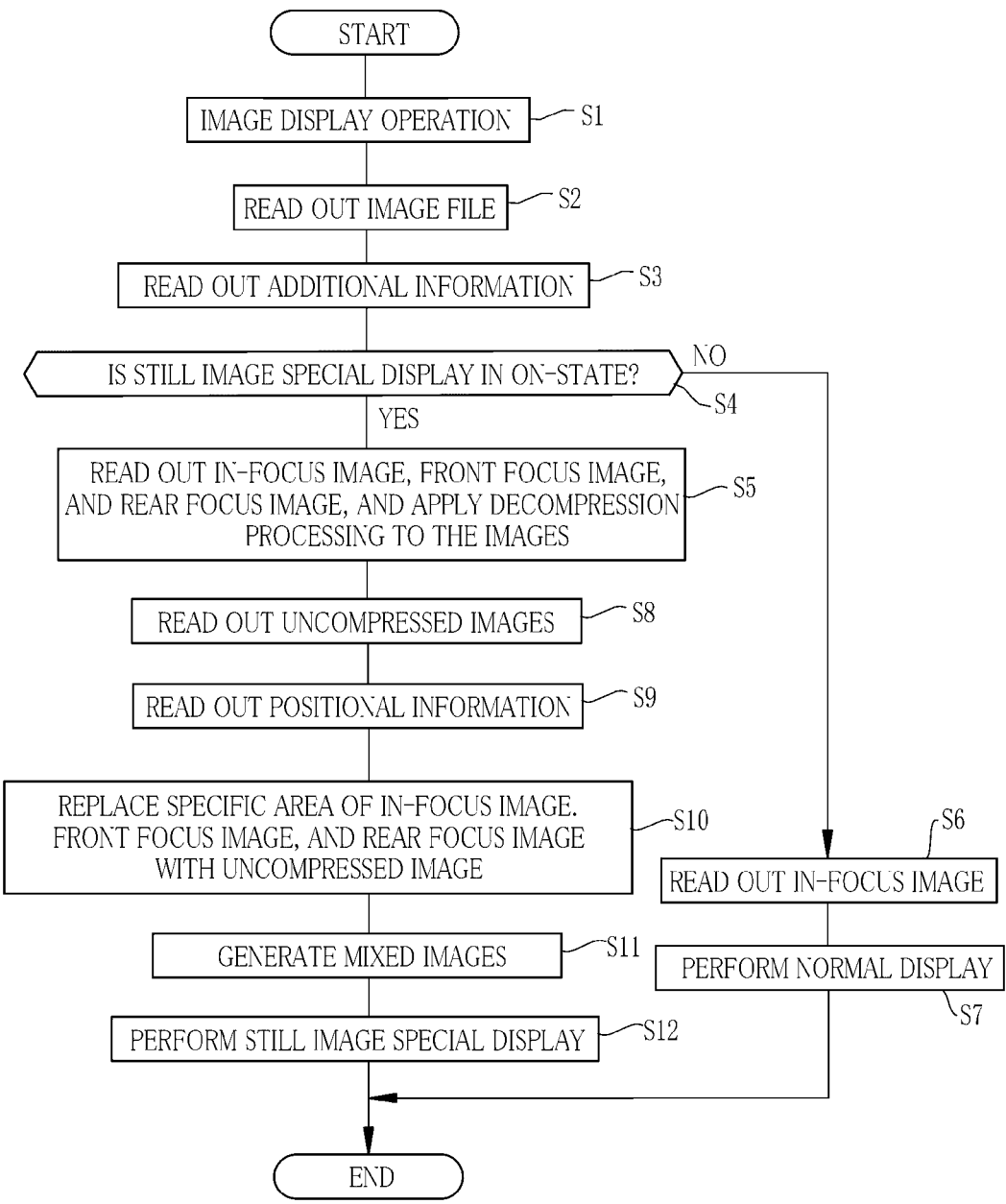

STILL IMAGE GENERATION DEVICE FOR PROVIDING A FIRST AND SECOND MIXTURE OF AN IN-FOCUS IMAGE AND AN OUT-OF-FOCUS IMAGE

CROSS-REFERENCE TO RELATED APPLICATIONS

This application is a continuation of PCT International Application No. PCT/JP2013/074206 filed on Sep. 9, 2013, which claims priority under 35 U.S.C. 35 §119(a) to Japanese Patent Application No. 2012-204238 filed on Sep. 18, 2012. Each of the above applications is hereby expressly incorporated by reference, in its entirety, into the present application.

BACKGROUND OF THE INVENTION

1. Field of the Invention

The present invention relates to a still image display device and system that display still images in the manner of moving images, and an imaging device.

2. Description Related to the Prior Art

Digital cameras, personal computers, cellular phones and the like have the function of reading out still images stored in a memory and reproducing and displaying the still images on a liquid crystal display. The equipment having the function of reproducing and displaying the still images is hereinafter referred to as a still image display device.

The still image display device generally continues displaying the single still image, as long as there is no frame advance operation. The continuous display of the still image is not entertaining enough, and therefore an improvement is made to enhance realism such as a moving image by means of changing a display state of the still image. For example, Japanese Patent Laid-Open Publication No. 2002-290831 describes a still image display device that displays a still image in which a focus position gradually moves from a near view to a far view. According to this still image display device, a blur function, which represents the degree of blurriness caused by a deviation from a focus, is calculated with the use of a near view focus image focusing on a near view side of an object and a far view focus image focusing on a far view side of the same object. Thereby, there are produced a plurality of blur taste adjustment images that can be obtained by imaging the object at arbitrary focus positions. By sequentially displaying the plurality of blur taste adjustment images, the still image is displayed in the manner of a moving image such that the focus position gradually moves from the near view to the far view.

The still image display device described in the Japanese Patent Laid-Open Publication No. 2002-290831 has a problem that large variation in a blur amount makes the image hard to see, because the focus position moves from the near view to the far view. Also, the production of the images having the plurality of focus positions by setting the blur function requires a complex arithmetic operation.

SUMMARY OF THE INVENTION

An object of the present invention is to provide a still image display device and system and an imaging device that can easily produce a plurality of images that are easy to see and have different blur tastes.

To achieve the above and other objects, a still image display device according to the present invention includes a recording medium, a reader, a blur evaluation value calculator, a blur evaluator, a mixture ratio determiner, a mixed image generator, a display unit, and a display controller. The recording medium records an in-focus image and an out-of-focus image obtained by imaging an identical object. The reader reads out the in-focus image and the out-of-focus image from the recording medium. The blur evaluation value calculator calculates a blur evaluation value based on a high frequency component contained in the in-focus image and the out-of-focus image. The blur evaluator evaluates the degree of blurriness of the out-of-focus image relative to the in-focus image by comparing the blur evaluation value with a predetermined reference value. The mixture ratio determiner chooses a first mixture ratio set in a case where the blur evaluation value is evaluated to be equal to or more than the reference value, and chooses a second mixture ratio set in a case where the blue valuation value is evaluated to be less than the reference value. The first mixture ratio set refers to one set having a gradually varying mixture ratio for mixing the in-focus image and the out-of-focus image. The second mixture ratio set refers to one set having a higher mixture ratio of the in-focus image and a lower mixture ratio of the out-of-focus image than the first mixture ratio set. The mixed image generator generates a plurality of mixed images from the in-focus image and the out-of-focus image read out of the recording medium in accordance with a chosen one of the first and second mixture ratio sets. The display controller sequentially displays the plurality of mixed images on the display unit.

It is preferable that the display controller sequentially display the plurality of mixed images on the display unit in order of increasing a mixture ratio of the in-focus image from a low value to a high value, or in order of decreasing the mixture ratio of the in-focus image from the high value to the low value. It is also preferable that the display controller alternately repeat the display in the increasing order and the display in the decreasing order.

Each of the mixture ratio of the in-focus image and a mixture ratio of the out-of-focus image preferably varies in the range of 0% to 100%. The still image display device preferably includes a high frequency component analyzer for analyzing the high frequency component from the in-focus image and the out-of-focus image. The high frequency component is preferably included in advance in the in-focus image and the out-of-focus image.

The still image display device preferably includes an image registering unit for performing registering processing of the out-of-focus image relative to the in-focus image. At this time, the mixed image generator uses the out-of-focus image after being subjected to the registering processing by the image registering unit. The display controller preferably switches image display with fading processing by which a preceding display fades out while a following display fades in. The display controller preferably displays the mixed image having a mixture ratio of 100% of the in-focus image for longer time than the other mixed images.

There are preferably used two types of images as the out-of-focus image, i.e. a front focus image obtained by focusing on a short position relative to an in-focus position at the time of obtaining the in-focus image, and a rear focus image obtained by focusing on a long position relative to the in-focus position. The mixed image generator preferably generates a plurality of front focus mixed images from the in-focus image and the front focus image, and a plurality of rear focus mixed images from the in-focus image and the rear focus image. In this case, the display controller displays the plurality of front focus mixed images in the increasing order on the display unit, and then displays the plurality of rear focus mixed images in the decreasing order. Each of a mixture ratio between the in-focus image and the front focus image and a mixture ratio between the in-focus image and the rear focus image preferably varies in the range of 0% to 100%.

An imaging device according to the present invention includes an imaging optical system, an imaging unit, a focus lens driver, a focus evaluation value calculator, an in-focus position detector, a lens drive controller, a writer, and the above-described still image display device. The imaging optical system has a focus lens shiftable in an optical axis direction. The imaging unit captures an in-focus image and an out-of-focus image of an identical object through the imaging optical system. The focus lens driver shifts the focus lens to the optical axis direction during focus control. The focus evaluation value calculator calculates a focus evaluation value in each position of the focus lens during the focus control based on a high frequency component of an image captured by the imaging unit. The in-focus position detector detects an in-focus position based on the focus evaluation value. The lens drive controller controls the focus lens driver to set the focus lens at the in-focus position and an out-of-focus position a predetermined distance away from the in-focus position, so that the imaging unit captures the in-focus image and the out-of-focus image. The writer writes to a recording medium a high frequency component in a specific area of the in-focus image and the out-of-focus image as additional information, together with the in-focus image and the out-of-focus image.

A still image display system according to the present invention includes an imaging device and a still image display device. The imaging device includes the imaging optical system, the imaging unit, the focus lens driver, the focus evaluation value calculator, the in-focus position detector, the lens drive controller, and the writer. The still image display device includes the reader, the blur evaluation value calculator, the blur evaluator, the mixture ratio determiner, the mixed image generator, the display unit, and the display controller.

It is preferable that the still image display system further includes a registering unit for applying registering processing to the specific area in the in-focus image and the out-of-focus image. The blur evaluation value calculator preferably calculates the blur evaluation value based on the high frequency component included in the specific area in the in-focus image and the out-of-focus image.

According to the present invention, one of the first mixture ratio set and the second mixture ratio set is chosen in accordance with the blur evaluation value. The plurality of mixed images are produced from the in-focus image and the out-of-focus image read out of the recording medium based on the chosen mixture ratio set, and sequentially displayed. Therefore, it is possible to reproduce a still image that is easy to see for a user with low variation in blurriness, in the manner of a moving image.

BRIEF DESCRIPTION OF THE DRAWINGS

For more complete understanding of the present invention, and the advantage thereof, reference is now made to the subsequent descriptions taken in conjunction with the accompanying drawings, in which:

FIG. 10 is an explanatory view that explains display control for displaying the in-focus image for long time with performing the fading processing;

FIG. 19 is a flowchart showing a procedure in which the imaging device according to the third embodiment performs imaging for special display;

FIG. 20 is a flowchart showing a procedure in which the still image display device according to the third embodiment performs image display.

DESCRIPTION OF THE PREFERRED EMBODIMENTS

Figure 1:
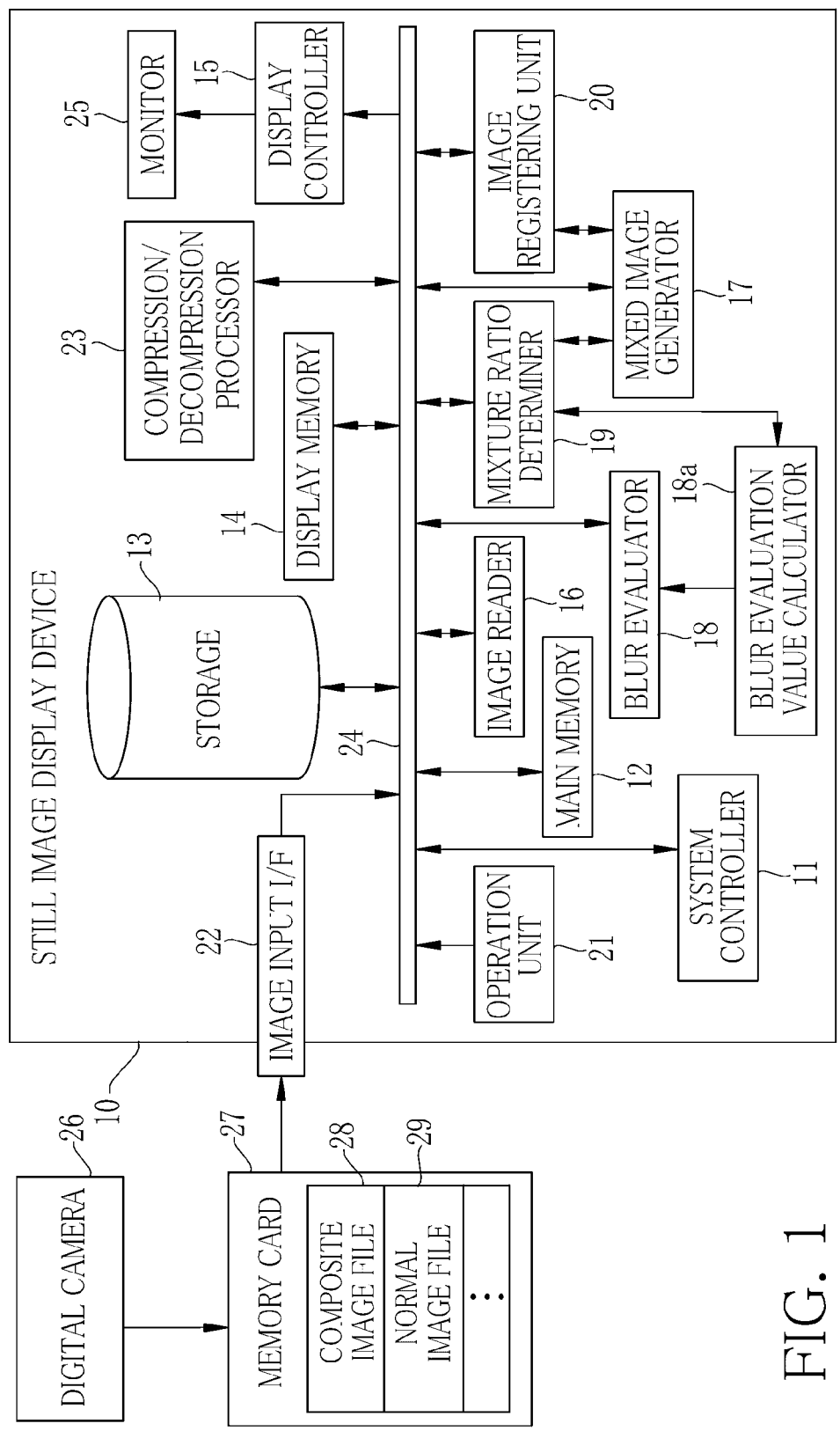
FIG. 1 is a schematic view showing an example of a still image display device.

As shown in FIG. 1, a still image display device 10 is provided with a system controller 11, a main memory 12 for storing various types of programs and the like and serving as a work area during running the programs, storage 13 for storing images and the like, a display memory 14 for temporarily storing display data, and a display controller 15 for controlling the display of an image, text, and the like based on image data, text data, and the like from the display memory 14. The still image display device 10 also includes an image reader 16, a mixed image generator 17, a blur evaluator 18, a blur evaluation value calculator 18a, a mixture ratio determiner 19, an image registering unit 20, an operation unit 21, an image input I/F 22, a compression/decompression processor 23, and a bus 24 for connecting these components.

The system controller 11 has control over the still image display device 10 by sequentially executing the various types of programs and data read out of the main memory 12 based on a control signal from the operation unit 21. To the display controller 15, a monitor 25 such as a liquid crystal display is connected as a display unit. The still image display device 10 reads out an image file stored in a memory card 27, and displays an image on the monitor 25. This image is what is taken with a digital camera 26 and stored in the memory card 27. The operation unit 21 has a keyboard and a mouse.

Figure 2:
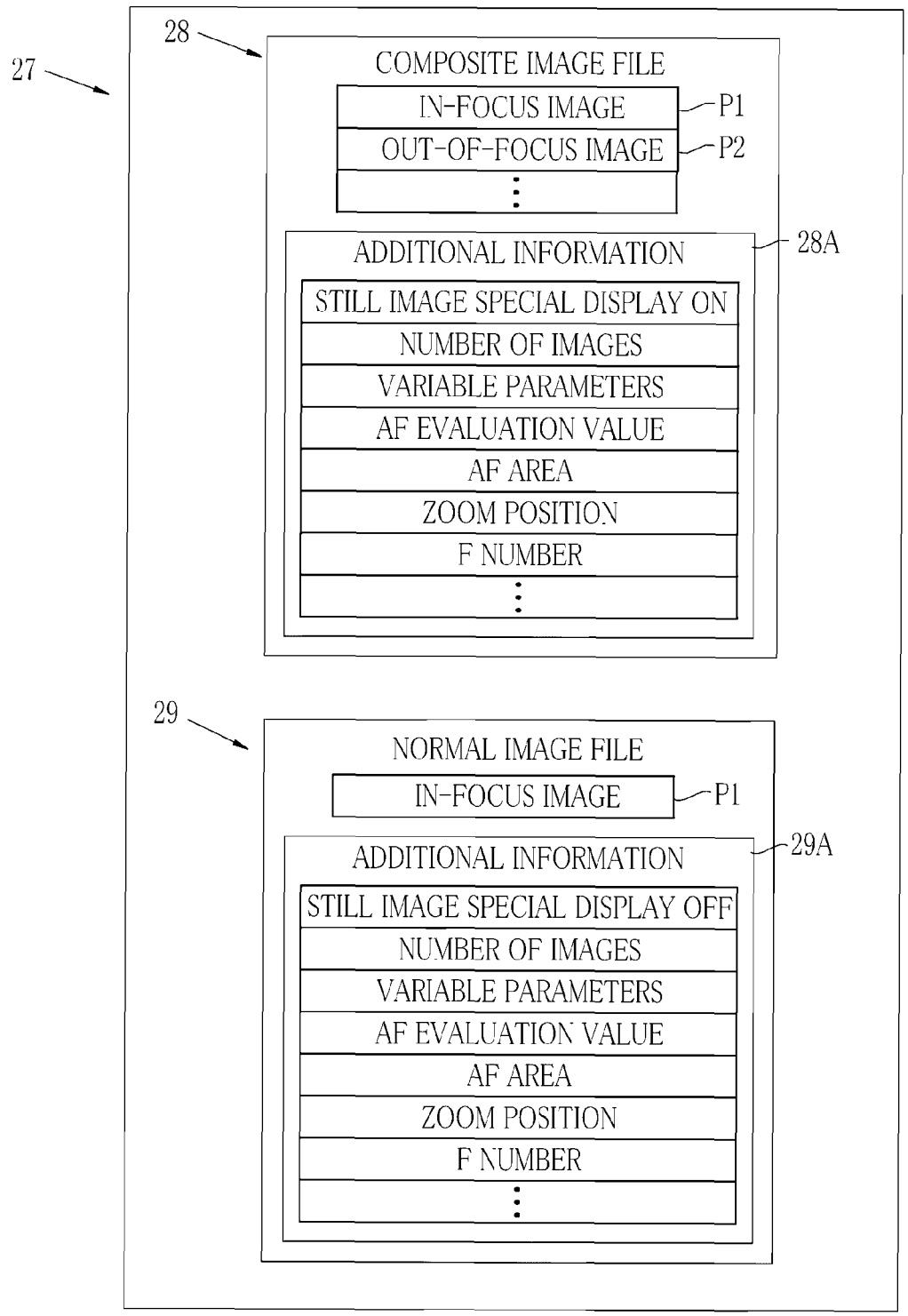
FIG. 2 is a schematic view showing the structure of an image file.

As shown in FIG. 2, the digital camera 26 captures an in-focus image (in-focus image frame) P1 and an out-of-focus image (out-of-focus image frame) P2 of an identical object. The in-focus image P1, the out-of-focus image P2, and additional information 28A are stored to the memory card 27 as a composite image file 28. Instead of or in addition to this, only the in-focus image P1 is captured as to the identical object, and the in-focus image P1 and additional information 29A are recorded to the memory card 27 as a normal image file 29. Exif-format data is used as the additional information 28A and 29A, for example, and information is written to an Exif tag area of the image data. The additional information 28A and 29A includes information about still image special display on/off as described later on, the number of images, an AF evaluation value and an AF evaluation area used in AF processing in capturing the in-focus image P1 and the out-of-focus image P2, an exposure value (an f number and a shutter speed) used in AE control processing, a zoom position, and the like.

Note that, in this embodiment, a front-focus out-of-focus image (hereinafter called front focus image), which is obtained by focusing on a short position relative to the in-focus image, is used as the out-of-focus image P2. Besides this, a rear-focus out-of-focus image (hereinafter called rear focus image), which is obtained by focusing on a long position, may be used as the out-of-focus image P2.

The information about the still image special display on/off included in the additional information 28A and 29A is used for determining whether or not to perform a still image special display, by which a plurality of mixed images composed of the in-focus image P1 and the out-of-focus image P2 are sequentially displayed when the still image display device 10 displays a still image. The information about the sill image special display on is stored to perform the still image special display, while the information about the still image special display off is stored not to perform the still image special display. In this embodiment, the information about the still image special display on is stored in the composite image file 28, and the information about the still image special display off is stored in the normal image file 29.

In connecting the memory card 27, the image input I/F 22 controls an input of the composite image files 28 or the normal image files 29 stored in the memory card 27. The image input I/F 22 sequentially sends the composite image files 28 or the normal image files 29 read out of the memory card 27 to the storage 13 through the bus 24. A hard disk drive is used as the storage 13, for example.

The image reader 16 performs reading processing for reading out the composite image files 28 or the normal image files 29 in predetermined order from the storage 13. The readout order is, for example, alphabetical order by file names (e.g. PIC1, PIC2, PIC3, . . . ), or chronological or reverse chronological order of imaging dates. Upon performing an image display operation from the operation unit 21, the image reader 16 reads out the first composite image file 28 or the first normal image file 29 from the storage 13 and stores the read file. While the image is displayed on the monitor 25, the image reader 16 reads out the next composite image file 28 or the next normal image file 29 from the storage 13, and writes the read file over the composite image file 28 or the normal image file 29 stored before.

Note that, in a case where the in-focus image P1 and the out-of-focus image P2 of the composite image file 28 or the normal image file 29 stored in the storage 13 are in a compressed format (for example, a JPEG format), the compression/decompression processor 23 applies decompression processing to the images.

In a case where the image reader 16 reads out the composite image file 28 from the storage 13, the mixed image generator 17 produces a plurality of mixed images by mixing the in-focus image P1 and the out-of-focus image P2 of the composite image file 28 at a mixture ratio determined by the mixture ratio determiner 19 described later on. In this case, a function G(x,y) indicating the mixed images is represented by the following expression (1):

$$G(x,y)=f1(x,y)*K1+f2(x,y)*K2 \qquad (1)$$

Wherein, f1(x,y) represents a function of the in-focus image P1, and f2(x,y) represents a function of the out-of-focus image P2, and K1:K2 is the mixture ratio between the in-focus image P1 and the out-of-focus image P2. By substituting pixel values of each pixel of the in-focus image P1 and the out-of-focus image P2 and the mixture ratio determined by the mixture ratio determiner 19 into this expression (1), a pixel value of each pixel of the mixed image is obtained.

Figure 3:
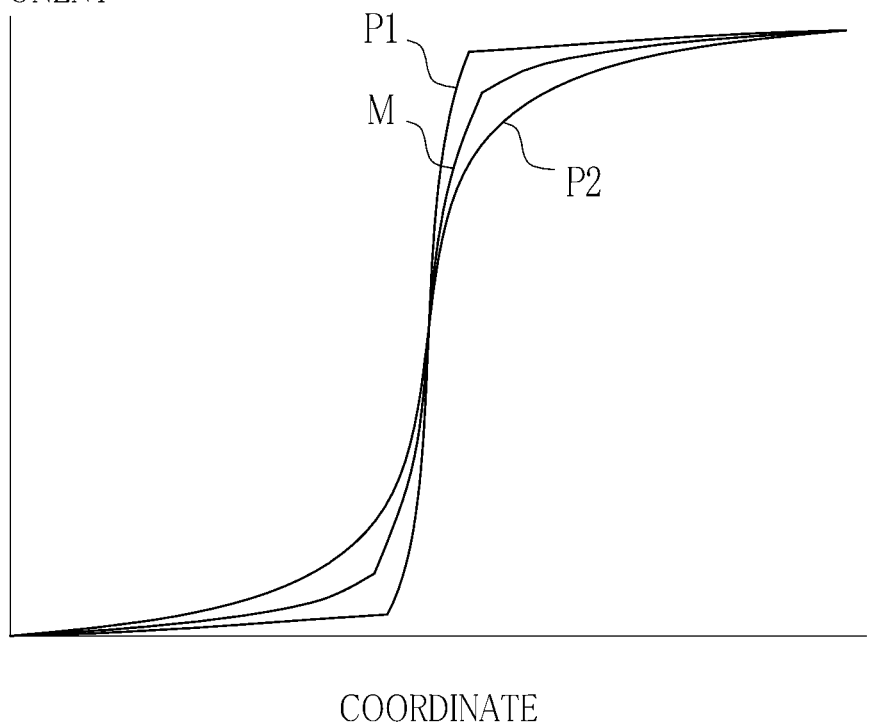
FIG. 3 is a graph showing a waveform of a high frequency component of a mixed image.

FIG. 3 shows an example of high frequency components of the in-focus image P1, the out-of-focus image P2, and a mixed image M. The high frequency component of the mixed image M has an intermediate waveform between the high frequency component of the in-focus image P1 and the high frequency component of the out-of-focus image P2. Thus, the waveform of the high frequency component of the mixed image M gets close to the waveform of the high frequency component of the in-focus image P1 with increase in the mixture ratio of the in-focus image P1, while gets close to the waveform of the high frequency component of the out-of-focus image P2 with increase in the mixture ratio of the out-of-focus image P2. Therefore, varying the mixture ratio of the in-focus image P1 and the out-of-focus image P2 can make an adjustment to the degree of blurriness in the mixed image M.

Note that, mixed image generation processing performed by the mixed image generator 17 is arbitrarily changeable depending on the type of data of the in-focus image P1 and the out-of-focus image P2, being sources of the mixed image. For example, in a case where the data of the in-focus image P1 and the out-of-focus image P2 is defined in color space of Y, Cb, and Cr, values of luminance Y, hue Cb, and chroma Cr of each pixel of the mixed image may be obtained by substituting values of luminance Y, hue Cb, and chroma Cr of each pixel of the in-focus image P1 and the out-of-focus image P2 into the above expression. Also, in a case where the data of the in-focus image P1 and the out-of-focus image P2 is defined in color space of RGB, values of R, G, and B of each pixel of the mixed image may be obtained by substituting values of R, G, and B of each pixel of the in-focus image P1 and the out-of-focus image P2.

The blur evaluation value calculator 18a calculates a blur evaluation value based on the high frequency components contained in the in-focus image P1 and the out-of-focus image P2. The blur evaluator 18 evaluates the degree of blurriness of the out-of-focus image P1 relative to the in-focus image P1 by comparing the blur evaluation value with a predetermined reference value. The blur evaluation value calculator 18a according to this embodiment reads out a focus evaluation value H1 of the in-focus image P1 and a focus evaluation value H2 of the out-of-focus image P2 contained in the additional information 28A of the composite image file 28. By using the focus evaluation values H1 and H2 as values of the high frequency components contained in the in-focus image P1 and the out-of-focus image P2, a blur evaluation value HS is calculated. Note that, the blur evaluation value may be calculated from the high frequency components within a specific area of the in-focus image P1 and the out-of-focus image P2, instead of from the high frequency components contained in the whole of the in-focus image P1 and the out-of-focus image P2. For example, the high frequency component contained in the AF evaluation area in capturing the in-focus image may be used. In this case, the high frequency components of the in-focus image P1 and the out-of-focus image P2 are extracted from the same specific area.

As the blur evaluation value HS based on the high frequency components, the ratio (blur evaluation value HS=H2/H1) of the focus evaluation value H2 of the out-of-focus image P2 to the focus evaluation value H1 of the in-focus image P1 is used. The smaller a value of the high frequency component contained in the image, the more the image goes out of focus. Therefore, the degree of blurriness of the out-of-focus image P2 to the in-focus image P1 increases with decrease in the blur evaluation value HS, and the degree of blurriness of the out-of-focus image P2 to the in-focus image P1 decreases with increase in the blur evaluation value HS. The blur evaluator 18 compares the blur evaluation value HS with a predetermined reference value HK. In a case where the blur evaluation value HS is the reference value HK or more, an evaluation result indicating that the degree of blurriness of the out-of-focus image P2 to the in-focus image P1 is small is sent to the mixture ratio determiner 19. In a case where the blur evaluation value HS is less than the reference value HK, an evaluation result indicating that the degree of blurriness of the out-of-focus image P2 to the in-focus image P1 is large is sent to the mixture ratio determiner 19.

Note that, the blur evaluation value is not limited to above, and may be another value as long as the value is based on the high frequency components contained in the in-focus image P1 and the out-of-focus image P2 and usable for evaluating the degree of blurriness of the out-of-focus image P2 to the in-focus image P1. For example, the blur evaluation value may be the difference (H1−H2) between the focus evaluation value H1 of the in-focus image P1 and the focus evaluation value H2 of the out-of-focus image P2.

The mixture ratio determiner 19 chooses one of two types of mixture ratio sets, that is, first and second mixture ratio sets for determining the ratio of mixture of the in-focus image P1 and the out-of-focus image P2, in accordance with the blur evaluation result. Each mixture ratio set denotes a set of gradually varying mixture ratios.

Figure 4A:
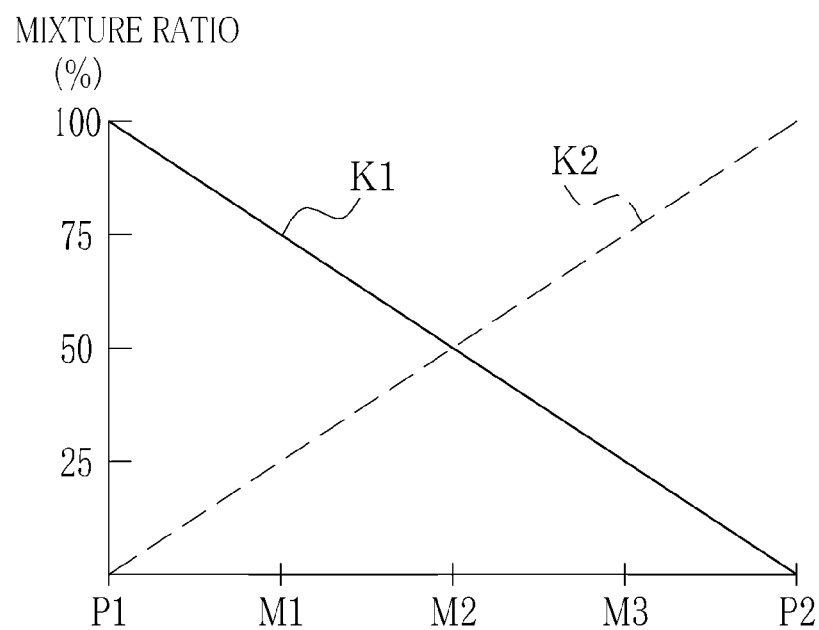
FIG. 4A is a graph showing a mixture ratio according to a first mixture ratio set used in producing the mixed image from an in-focus image and an out-of-focus image.

As shown in FIG. 4A, the first mixture ratio set has a combination of mixture ratios K1:K2 between the in-focus image P1 and the out-of-focus image P2 of 75:25, 50:50, and 25:75. In this first mixture ratio set, the mixture ratio K2 of the out-of-focus image P2 is usable in the range of 0% to 100%. Also, in the first mixture ratio set, the mixture ratio K1:K2 of the in-focus image P1 and the out-of-focus image P2 increases and decreases equally in the combination, e.g. by 25% in this embodiment. Note that, this "equally" includes the case of substantially equally increasing and decreasing the mixture ratio.

Figure 4B:
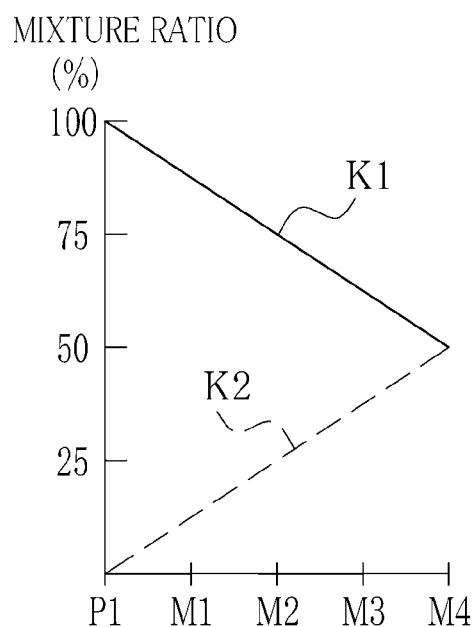
FIG. 4B is a graph showing a mixture ratio according to a second mixture ratio set used in producing the mixed image from the in-focus image and the out-of-focus image.

On the other hand, as shown in FIG. 4B, the second mixture ratio set has a higher mixture ratio of the in-focus image P1 and a lower mixture ratio of the out-of-focus image P2 than the first mixture ratio set. The second mixture ratio set has a combination of the mixture ratios K1:K2 between the in-focus image P1 and the out-of-focus image P2 of 88:12, 75:25, 63:37, and 50:50. According to this second mixture ratio set, the mixture ratio K2 of the out-of-focus image P2 is limited within the range of 0% to 50%, in order to reduce blurriness with respect to the in-focus image P1. Also, in the second mixture ratio set, the mixture ratio K1:K2 of the in-focus image P1 and the out-of-focus image P2 increases and decreases equally in the combination, e.g. by 12% or 13% in this embodiment.

Also, the original 100% out-of-focus image P2 is displayed as one of the mixed images based on the first mixture ratio set, but not displayed as one of the mixed images based on the second mixture ratio set. Thus, although the first mixture ratio set includes the three mixture ratios, the second mixture ratio set includes the four mixture ratios, which are one more than the number of the mixture ratios of the first mixture ratio set.

The mixed image generator 17 produces three mixed images M1, M2, and M3 based on the three mixture ratios of the first mixture ratio set. As for the second mixture ratio set, the mixed image generator 17 produces four mixed images M1, M2, M3, and M4 based on the four mixture ratios thereof. The mixed images produced by the mixed image generator 17 are temporarily stored to the display memory 14.

In producing the mixed images, the image registering unit 20 performs registering processing to adjust the position of the original in-focus image P1 and the original out-of-focus image P2. In the case of capturing two images at different times to obtain the in-focus image P1 and the out-of-focus image P2, a slight position shift (a position shift in a plane orthogonal to an optical axis and a position shift in the direction of the optical axis) occurs between the two images due to the difference in time of imaging. To correct such a position shift between the images, it is preferable to perform the registering processing before superimposing the two images. In the registering processing, for example, a point of the out-of-focus image P2 corresponding to a characteristic point of the in-focus image P1 is detected, and parameters (a rotation parameter, a shift parameter, and a scale-up and -down parameter), which make the characteristic point of the in-focus image P1 coincide with the corresponding point of the out-of-focus image P2, are calculated. The position of the in-focus image P1 and the out-of-focus image P2 is adjusted by rotating, shifting, and scaling up or down the out-of-focus image P2 with the use of these parameters. Also, in the registering processing, a not-overlapped portion may occur in the periphery of the two images. In this case, the in-focus image P1 and the out-of-focus image P2 are trimmed so as to remove the not-overlapped peripheral portion. To detect the position shift in the direction of the optical axis, which affects the size of an image, and the position shift in the plane orthogonal to the optical axis, a plurality of characteristic points are used.

Note that, the image registering unit 20 may perform the registering processing by detecting the characteristic point and the corresponding point in a specific area, instead of in the entire area of the in-focus image P1 and the out-of-focus image P2. In this case, the characteristic point and the corresponding point are detected within the same specific area of the in-focus image P1 and out-of-focus image P2, to perform the registering processing. As the specific area, for example, the AF evaluation area included in the additional information 28A of the composite image file 28 may be used.

After the mixed image generator 17 produces the plurality of mixed images based on the first mixture ratio set or the second mixture ratio set, the display controller 15 sequentially displays the plurality of mixed images on the monitor 25. The display controller 15 displays the plurality of mixed images in order of increasing the mixture ratio of the in-focus image P1 or decreasing the mixture ratio of the in-focus image P1. In this embodiment, the display in the increasing order and the display in the decreasing order are repeated alternately.

Provided that the mixed images M1, M2, and M3 are produced based on the first mixture ratio set, the display controller 15 displays the in-focus image P1 and the out-of-focus image P2 together with the mixed images M1, M2, and M3. In this case, the in-focus image P1 and the out-of-focus image P2 are used as mixed images having a mixture ratio K1:K2 of the in-focus image P1 and the out-of-focus image P2 of 100:0 and 0:100, respectively. Therefore, in the case of the display in the increasing order, the display controller 15 displays the mixed images in order of increasing the mixture ratio of the in-focus image P1 from 0%, 25%, 50%, 75%, to 100%. In the case of the display in the decreasing order, the display controller 15 displays the mixed images in order of decreasing the mixture ratio of the in-focus image P1 from 100%, 75%, 50%, 25%, to 0%.

Provided that the mixed images M1, M2, M3, and M4 are produced based on the second mixture ratio set, the display controller 15 displays the in-focus image P1 together with the mixed images M1, M2, M3, and M4. Note that, the out-of-focus image P2 is not displayed. In this case, the in-focus image P1 is used as a mixed image having a mixture ratio K1:K2 of the in-focus image P1 and the out-of-focus image P2 of 100:0. Therefore, in the case of the display in the increasing order, the display controller 15 displays the mixed images in order of increasing the mixture ratio of the in-focus image P1 from 50%, 63%, 75%, 88%, to 100%. In the case of the display in the decreasing order, the display controller 15 displays the mixed images in order of decreasing the mixture ratio of the in-focus image P1 from 100%, 88%, 75%, 63%, to 50%.

Figure 5:
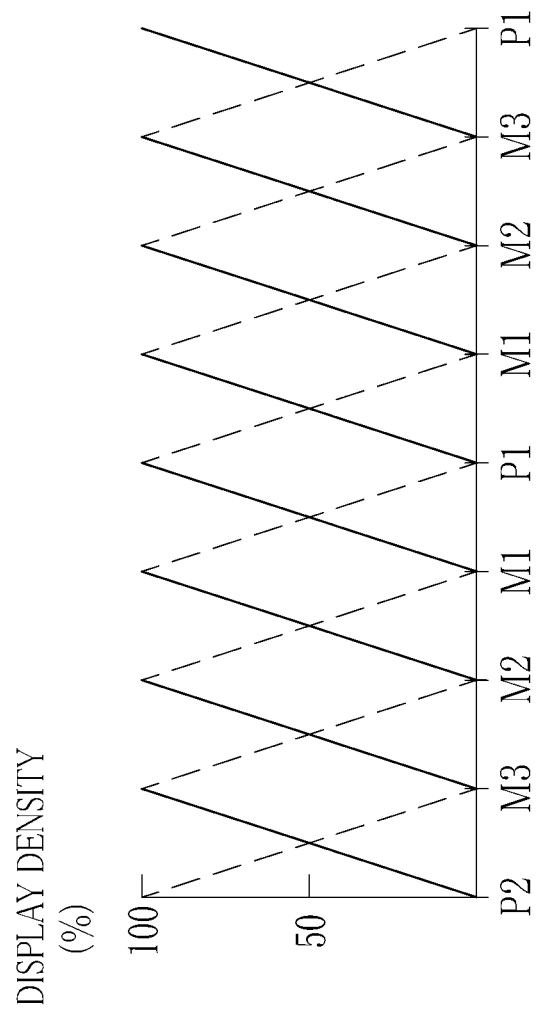
FIG. 5 is an explanatory view of fading processing.

Also, the display controller 15 switches the image display by fading processing by which in sequentially displaying the plurality of mixed images, a preceding display fades out while a following display fades in. In FIG. 5 being an explanatory view of the fading processing, a dotted line represents the display density of a preceding image and a solid line represents the display density of a following image. In this fading processing, when the display density of the preceding image is 100%, the display density of the following image is 0%. While the display density of the preceding image gradually decreases, the display density of the following image gradually increases. The display density of the preceding image and the display density of the following image vary such that the sum thereof becomes 100%, and hence when the display density of the preceding image comes to 0%, the display density of the following image comes to 100%. According to this fading processing by the display controller 15, it takes the same time for every image to fade out the preceding display, and the fade-in of the following display requires the same time as the fade-out of the preceding image.

Figure 6:
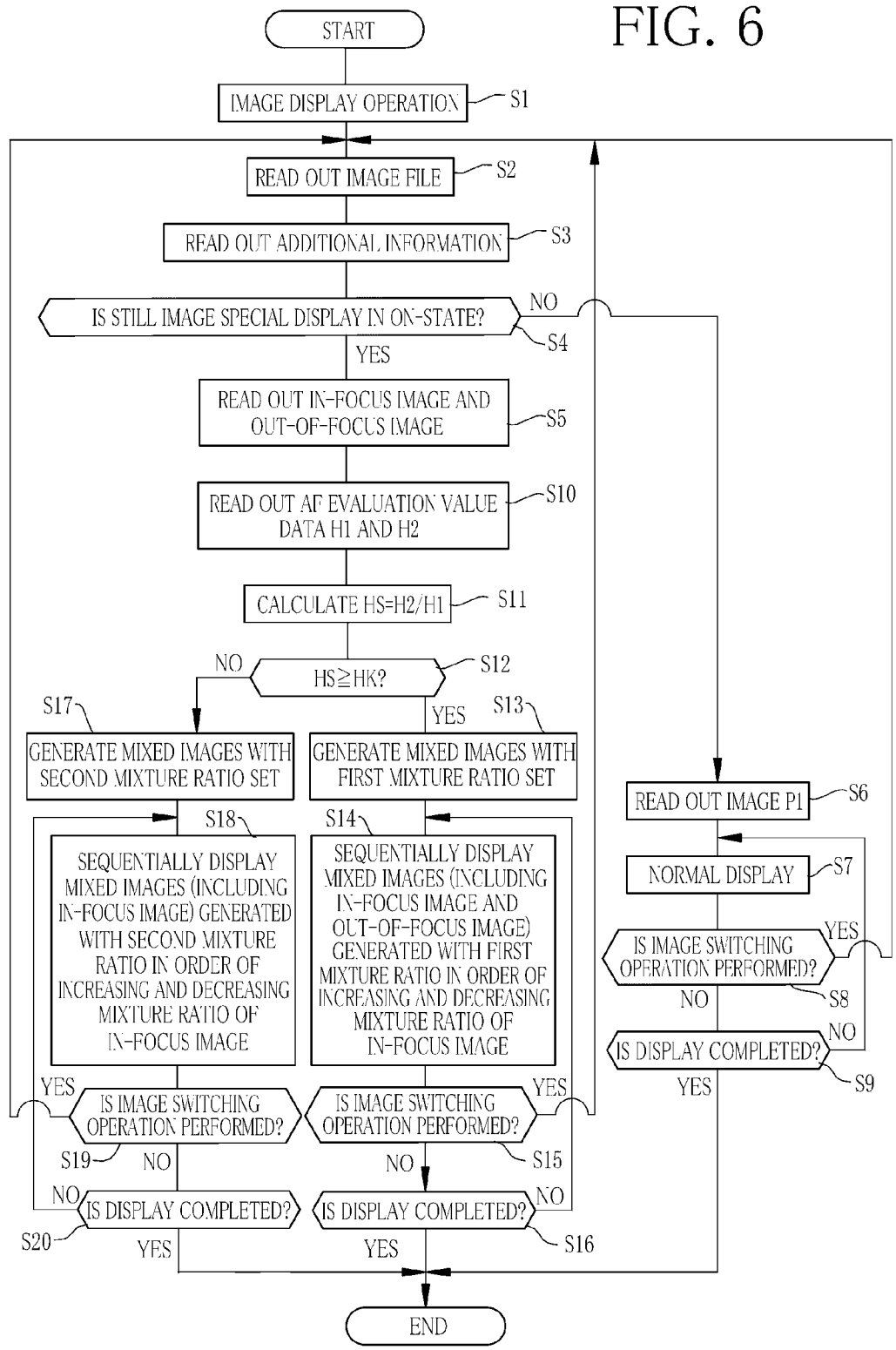
FIG. 6 is a flowchart showing a procedure for displaying still images.

Next, the operation of the still image display device 10 will be described with the use of a flowchart of FIG. 6. First, the memory card 27 taken out of the digital camera 26 is connected to the image input I/F 22. The composite image file 28 or the normal image file 29 stored in the memory card 27 is read out, and stored to the storage 13. After this storing processing, upon performing the image display operation (S1) with the operation unit 21, the system controller 11 issues a readout command to the image reader 16. The image reader 16 reads out the first composite image file 28 or the first normal image file 29 from the storage 13 (S2).

Then, the system controller 11 reads out the information about the still image special display on/off from the additional information 28A or 29A of the composite image file 28 or the normal image file 29 (S3). In a case where the still image special display on is recorded (YES in S4), the in-focus image P1 and the out-of-focus image P2 are read out from the composite image file 28 in order to perform the still image special display using the in-focus image P1 and the out-of-focus image P2 (S5).

On the other hand, in a case where the still image special display off is recorded (NO in S4), only the in-focus image P1 is read out from the normal image file 29 (S6), and a normal display is carried out (S7). Upon performing an image switching operation with the operation unit 21 (YES in S8), the normal display of the in-focus image P1 is completed, and the next composite image file 28 or the next normal image file 29 is read out (S2). In a case where a display completion operation is performed (YES in S9), the image display is completed (S9).

The system controller 11 reads out the focus evaluation values H1 and H2 of the additional information 28A following the readout of the in-focus image P1 and the out-of-focus image P2 from the composite image file 28 (S10). Upon issuing a blur evaluation command by the system controller 11, the blur evaluation value calculator 18a calculates the blur evaluation value HS=H2/H1 from the focus evaluation values H1 and H2 of the in-focus image P1 and the out-of-focus image P2, out of the additional information 28A added to the composite image file 28 (S11). The blur evaluator 18 compares the blur evaluation value HS with the reference value HK to perform a blur evaluation (S12).

In a case where the blur evaluator 18 judges that the blur evaluation value HS is the reference value HK or more (YES in S12), the mixture ratio determiner 19 chooses the first mixture ratio set. The mixed image generator 17 produces the mixed images based on the first mixture ratio set (S13). Thus, there are produced the mixed images M1, M2, and M3 having a mixture ratio K1:K2 between the in-focus image P1 and the out-of-focus image P2 of 75:25, 50:50, and 25:75, respectively.

After the mixed images M1, M2, and M3 are produced based on the first mixture ratio set, the display controller 15 displays the plurality of mixed images including the in-focus image P1 and the out-of-focus image P2 on the monitor 25 in the increasing order and the decreasing order of the mixture ratio (S14). In a case where no image switching operation is performed (NO in S15) and no display completion operation is performed (NO in S16), the display controller 15 continues displaying the mixed images in the increasing order and the decreasing order alternately. In a case where the image switching operation is performed (YES in S15), the display of the mixed images is completed, and the next composite image file 28 or the next normal image file 29 is read out (S2). In a case where the display completion operation is performed, the image display is completed (YES in S16).

In a case where the blur evaluator 18 judges that the blur evaluation value HS is less than the reference value HK (NO in S12), the mixture ratio determiner 19 chooses the second mixture ratio set. The mixed image generator 17 produces the mixed images M1, M2, M3, and M4 having a mixture ratio K1:K2 between the in-focus image P1 and the out-of-focus image P2 of 88:12, 75:25, 63:37, and 50:50, respectively (S17).

After the mixed images M1, M2, M3, and M4 are produced, the display controller 15 displays the plurality of mixed images including the in-focus image P1 on the monitor 25 in the increasing order and the decreasing order of the mixture ratio (S18). In a case where no image switching operation is performed (NO in S19) and no display completion operation is performed (NO in S20), the display controller 15 continues displaying the mixed images. In a case where the image switching operation (YES in S19) is performed, the display of the mixed images is completed, and the next composite image file 28 or the next normal image file 29 is read out (S2). In a case where the display completion operation is performed, the image display is completed (YES in S20).

As described above, the blur evaluation is performed with the use of the blur evaluation value based on the high frequency components of the in-focus image P1 and the out-of-focus image P2. In a case where the blur evaluation value is the reference value or more, the mixed images are produced with the first mixture ratio set. In a case where the blur evaluation value is less than the reference value, the mixed images are produced based on the second mixture ratio set, which has a higher mixture ratio of the in-focus image P1 and a lower mixture ratio of the out-of-focus image P2 than the first mixture ratio set. The second mixture ratio set allows production of the mixed images that have a low degree of blurriness relative to the in-focus image P1. Accordingly, it is possible to perform still image reproduction that is easy to see for a user with low variation in blurriness, by means of displaying the still image in the manner of a moving image.

According to the first embodiment, the mixed images are produced by using the in-focus image and the front focus image, being the out-of-focus image stored in the composite image file 28. The mixed images, however, may be produced by three types of images i.e. the front focus image, the rear focus image, and the in-focus image.

Figure 7A:
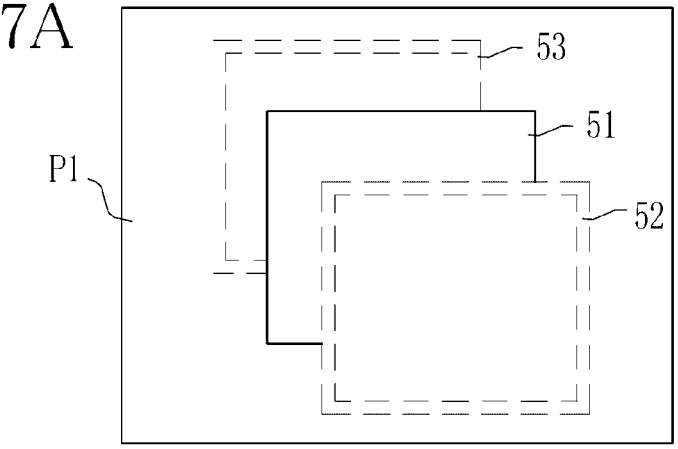
FIG. 7A is an explanatory view of the in-focus image.
Figure 7B:
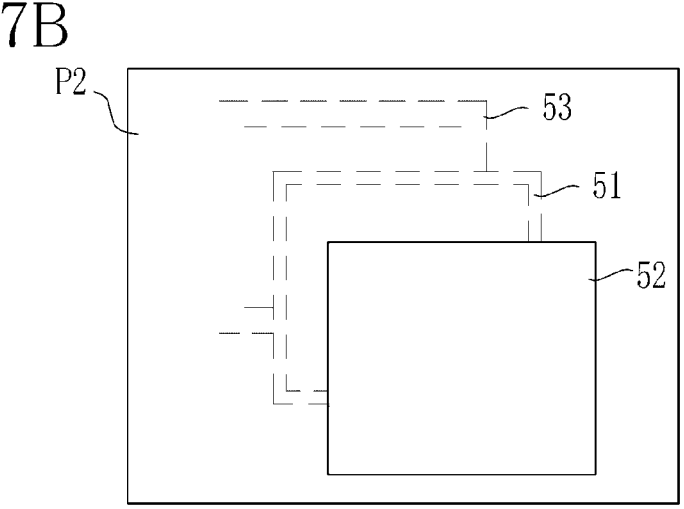
FIG. 7B is an explanatory view of a front focus image.
Figure 7C:
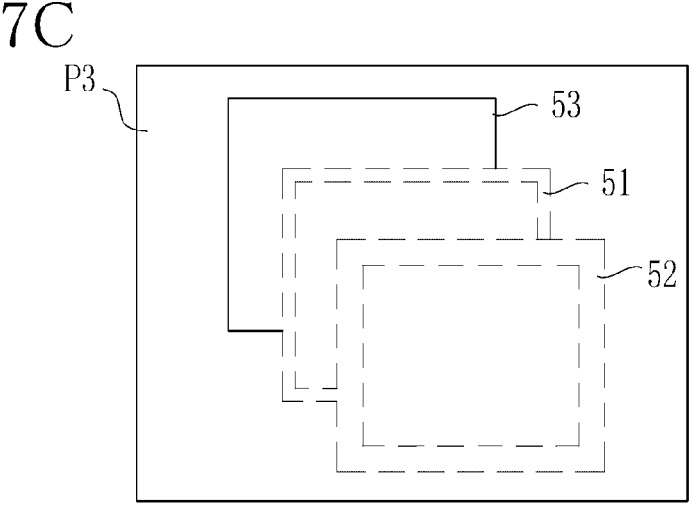
FIG. 7C is an explanatory view of a rear focus image.

FIGS. 7A to 7C are explanatory views schematically showing the in-focus image P1, a front focus image P2, and a rear focus image P3, respectively. The in-focus image P1 shown in FIG. 7A is obtained by focusing on an object 51, which is in about the middle in a depth direction. The front focus image P2 shown in FIG. 7B is obtained by focusing on an object 52, which is on a short position side relative to the in-focus image P1. The rear focus image P3 is obtained by focusing on an object 53, which is on a long position side relative to the in-focus image P1.

Figure 8:
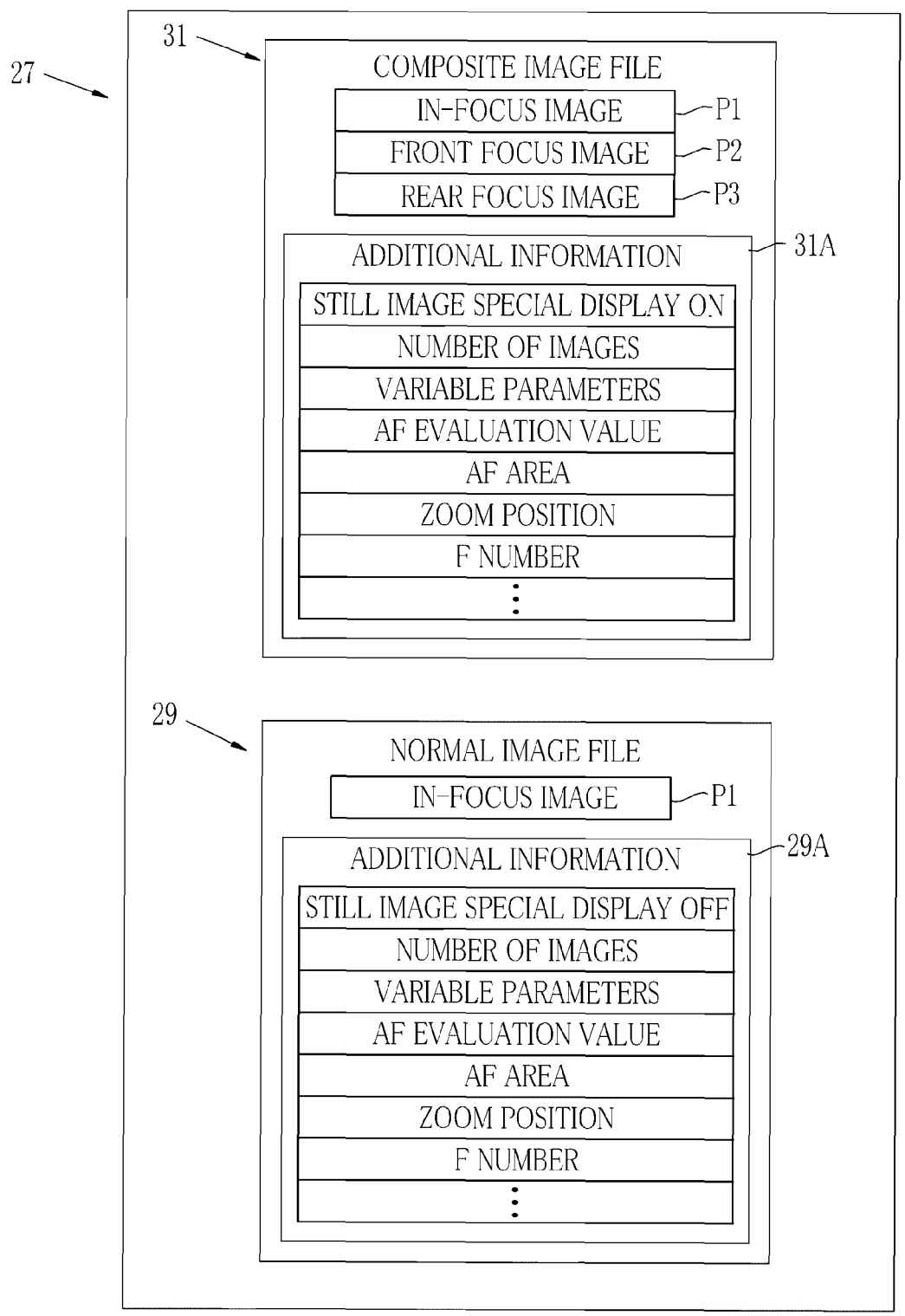
FIG. 8 is an explanatory view showing the structure of a composite image file having the in-focus image, the front focus image, and the rear focus image.

In this modification example, as shown in FIG. 8, the memory card 27 stores a composite image file 31 into which the in-focus image P1, the front focus image P2, and the rear focus image P3 obtained with respect to the identical object and additional information 31A are integrated, or the normal image file 29 being the same as that of the first embodiment. The mixed image generator 17 produces a front focus mixed image by mixing the in-focus image P1 and the front focus image P2, and a rear focus mixed image by mixing the in-focus image P1 and the rear focus image P3. Just as with the first embodiment, the mixture ratio determiner 19 chooses one of the first mixture ratio set and the second mixture ratio set in accordance with the evaluation result of the blur evaluator 18.

Figure 9A:
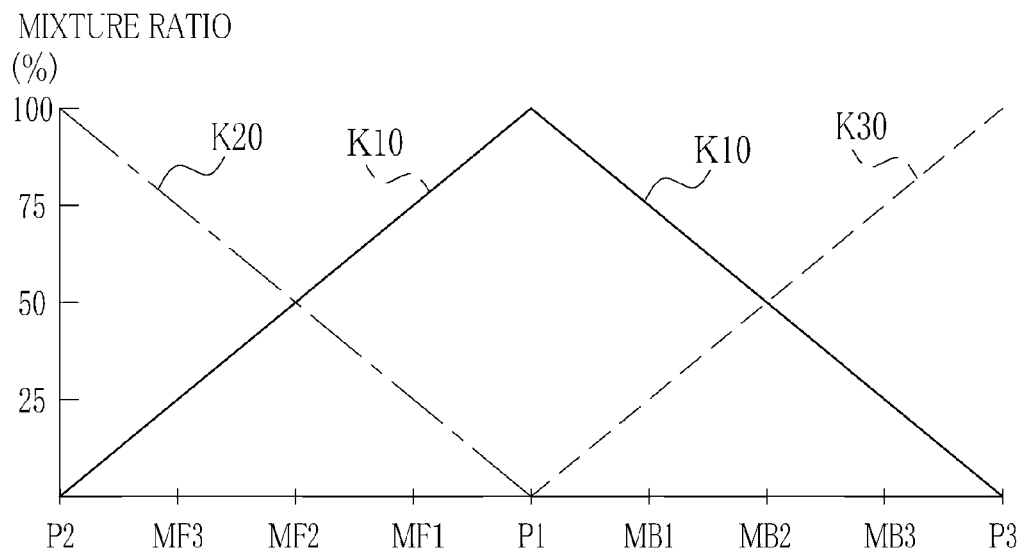
FIG. 9A is a graph showing a mixture ratio according to a first mixture ratio set used in producing the mixed image from the in-focus image, the front focus image, and the rear focus image.

As shown in FIG. 9A, the first mixture ratio set has a combination of mixture ratios K10:K20 between the in-focus image P1 and the front focus image P2 of 25:75, 50:50, and 75:25, and a combination of mixture ratios K10:K30 between the in-focus image P1 and the rear focus image P3 of 75:25, 50:50, and 25:75. According to the first mixture ratio set, the mixture ratio of the front focus image P2 and the mixture ratio of the rear focus image P3 are usable in the range of 0% to 100%. In the first mixture ratio set, just as with the first embodiment, the mixture ratio K10:K20 of the in-focus image P1 and the front focus image P2 and the mixture ratio K10:K30 of the in-focus image P1 and the rear focus image P3 increase and decrease equally in the combinations, e.g. by 25% in this modification example.

Figure 9B:
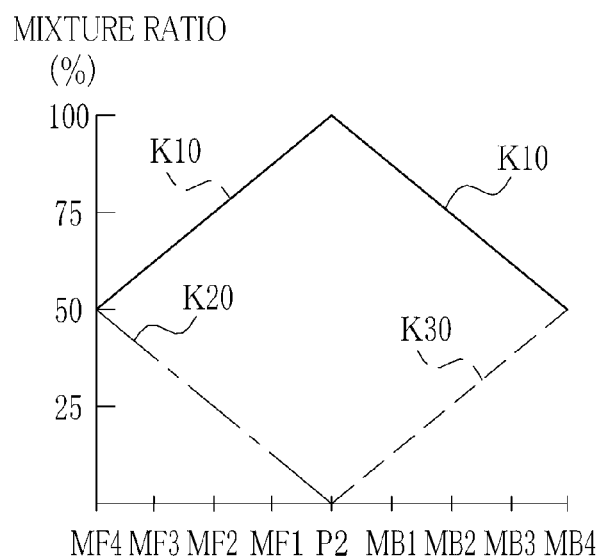
FIG. 9B is a graph showing a mixture ratio according to a second mixture ratio set used in producing the mixed image from the in-focus image, the front focus image, and the rear focus image.

On the other hand, as shown in FIG. 9B, the second mixture ratio set has a higher mixture ratio of the in-focus image P1 and a lower mixture ratio of the front focus image P2 and the rear focus image P3 than the first mixture ratio set. The second mixture ratio set includes a combination of mixture ratios K10:K20 between the in-focus image P1 and the front focus image P2 of 50:50, 63:37, 75:25, and 88:12, and a combination of mixture ratios K10:K30 between the in-focus image P1 and the rear focus image P3 of 88:12, 75:25, 63:37, and 50:50. According to this second mixture ratio set, just as with the first embodiment, the mixture ratio K20 of the front focus image P2 and the mixture ratio K30 of the rear focus image P3 are limited within the range of 0% to 50%, in order to reduce blurriness with respect to the in-focus image P1. Also, in the second mixture ratio set, just as with the first embodiment, the mixture ratio K10:K20 of the in-focus image P1 and the front focus image P2 and the mixture ratio K10:K30 of the in-focus image P1 and the rear focus image P3 increase and decrease equally in the combination, e.g. by 12% or 13% in this modification example.

As the blur evaluation value HS, are used a front focus blur evaluation value HS1=H2/H1 being the ratio of a focus evaluation value H2 of the front focus image P2 to a focus evaluation value H1 of the in-focus image P1, and a rear focus blur evaluation value HS2=H3/H1 being the ratio of a focus evaluation value H3 of the rear focus image P3 to the focus evaluation value H1 of the in-focus image P1. The blur evaluator 18 compares the blur evaluation values HS1 and HS2 with the predetermined reference value HK, and outputs one of a first evaluation result, which indicates that both of the blur evaluation values HS1 and HS2 are the reference value HK or more and both of the degree of blurriness of the front focus image P2 and the degree of blurriness of the rear focus image P3 relative to the in-focus image P1 are small, and a second evaluation result, which indicates that at least one of the blur evaluation values HS1 and HS2 is less than the reference value HK and the degree of blurriness relative to the in-focus image P1 is large. The mixture ratio determiner 19 chooses the first mixture ratio set in a case where the blur evaluator 18 outputs the first evaluation result, and chooses the second mixture ratio set in a case where the blur evaluator 18 outputs the second evaluation result.

The mixed image generator 17 produces front focus mixed images (MF1, MF2, and MF3) and rear focus mixed images (MB1, MB2, and MB3) based on the first mixture ratio set. Otherwise, the mixed image generator 17 produces front focus mixed images (MF1, MF2, MF3, and MF4) and rear focus mixed images (MB1, MB2, MB3, and MB4) based on the second mixture ratio set. The mixed images produced by the mixed image generator 17 are temporarily stored to the display memory 14.

In sequentially displaying the plurality of mixed images read out of the display memory 14, the display controller 15 sequentially displays the plurality of front focus mixed images on the monitor 25 in order of increasing the mixture ratio of the in-focus image P1. Then, the display controller 15 sequentially displays the plurality of rear focus mixed images on the monitor 25 in order of decreasing the mixture ratio of the in-focus image P1.

Provided that the mixed images MF1, MF2, MF3, MB1, MB2, and MB3 are produced based on the first mixture ratio set, the display controller 15 displays the in-focus image P1, the front focus image P2, and the rear focus image P3 together therewith. In this case, the in-focus image P1 and the front focus image P2 are used as front focus mixed images having a mixture ratio K10:K20 between the in-focus image P1 and the front focus image P2 of 100:0 and 0:100, respectively. The in-focus image P1 and the rear focus image P3 are used as rear focus mixed images having a mixture ratio K10:K30 between the in-focus image P1 and the rear focus image P3 of 100:0 and 0:100, respectively. Therefore, the display controller 15 displays the front focus mixed images in order of increasing the mixture ratio of the in-focus image P1 from 0%, 25%, 50%, 75%, to 100%, and the rear focus mixed images in order of decreasing the mixture ratio of the in-focus image P1 from 100%, 75%, 50%, 25%, to 0%.

Provided that the mixed images MF1, MF2, MF3, MF4, MB1, MB2, MB3, and MB4 are produced based on the second mixture ratio set, the display controller 15 displays the in-focus image P1 together therewith. Note that, the front focus image P2 and the rear focus image P3 are not displayed. In this case, the in-focus image P1 is used as a mixed image having a mixture ratio K10:K20 between the in-focus image P1 and the front focus image P2 of 100:0, or a mixed image having a mixture ratio K10:K30 between the in-focus image P1 and the rear focus image P3 of 100:0. Therefore, the display controller 15 displays the front focus mixed images in order of increasing the mixture ratio of the in-focus image P1 from 50%, 63%, 75%, 88%, to 100%, and the rear focus mixed images in order of decreasing the mixture ratio of the in-focus image P1 from 100%, 88%, 75%, 63%, to 50%. Also, the display controller 15 switches the image display by the fading processing by which in sequentially displaying the plurality of mixed images, a preceding display fades out while a following display fades in, just as with the first embodiment.

As described above, displaying the front focus and rear focus mixed images, which are produced from the in-focus image and the front focus and rear focus images in which the short position side and the long position side relative to the in-focus image are brought into focus, provides the user with a feeling of shifting the focus forward and backward and a sense of distance of the object in the images, and makes display more realistic.

Note that, according the first embodiment, the fading processing is performed during displaying the mixed images such that it takes the same time for every image to fade out the preceding display, while the following display fades in. However, the in-focus image P1 is preferably displayed for longer time than the other mixed images M1 and the like. In this case, as shown in FIG. 10, the fading processing by which the preceding display fades out while the following display fades in is performed in a like manner as the first embodiment during switching the image display. Then, provided that the display density of the in-focus image P1 comes to 100%, this state may be maintained to display only the in-focus image P1 for predetermined time. As a time for displaying the in-focus image P1, if a time for the fade-out and the fade-in is set at one second in the fading processing and a time for displaying only the in-focus image P1 is three seconds, as an example, the in-focus image P1 is displayed for five seconds in total. This is enough for the user to observe the in-focus image.

Figure 11:
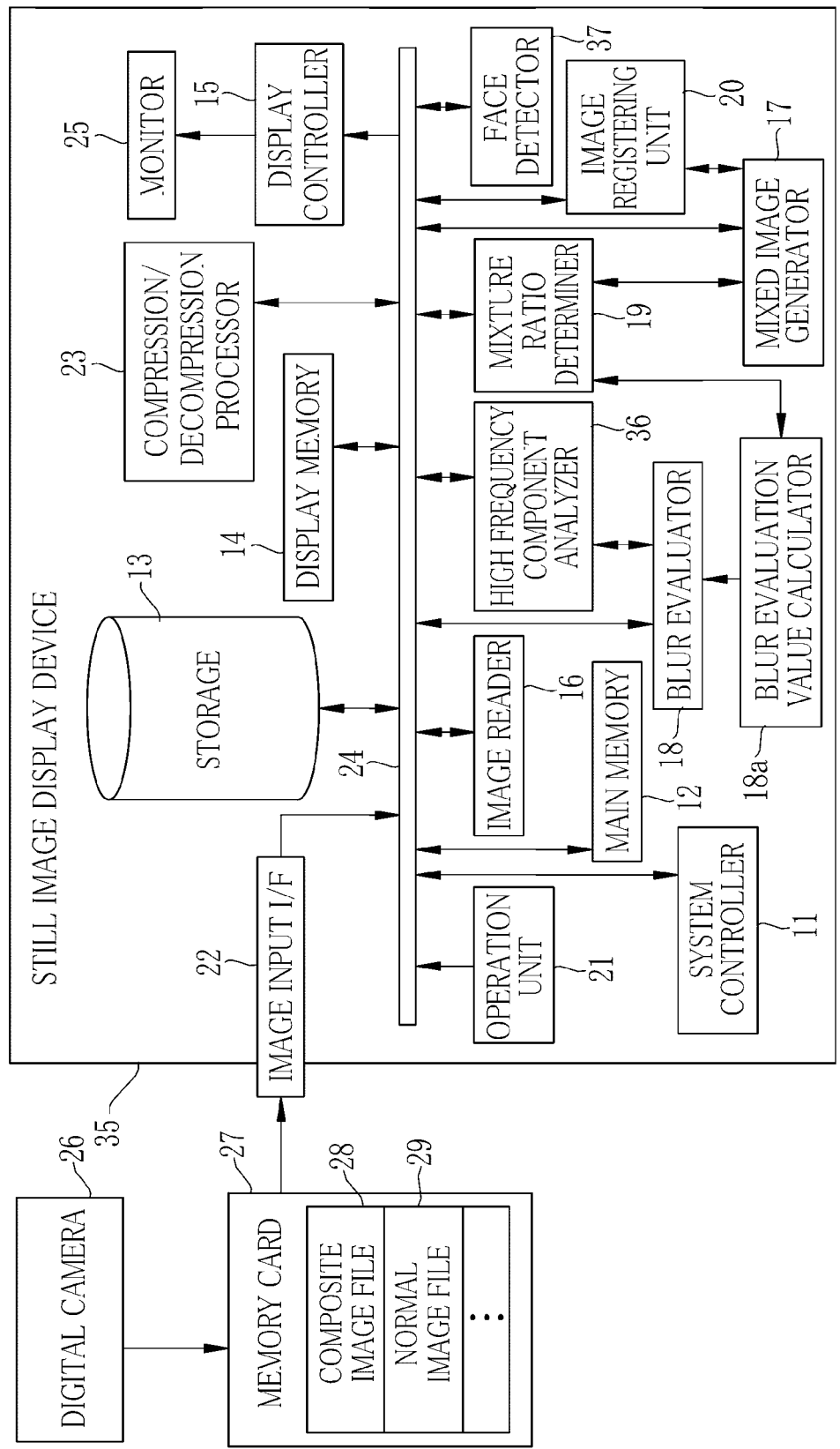
FIG. 11 is a schematic view showing the structure of a modification example of the still image display device.

According to the first embodiment, the AF evaluation values included in the additional information added to the in-focus image and the out-of-focus image are used for calculating the blur evaluation value as the high frequency components. Instead, as shown in FIG. 11, a still image display device 35 may be provided with a high frequency component analyzer 36, which analyzes the high frequency components of the in-focus image and the out-of-focus image in reading out the in-focus image and the out-of-focus image of the composite image file. In this case, the blur evaluation value calculator 18a calculates the blur evaluation value HS from the high frequency components of the in-focus image and the out-of-focus image analyzed by the high frequency component analyzer 36. The blur evaluator 18 performs the blur evaluation by comparing the blur evaluation value HS with the reference value HK.

Also, in the first embodiment, the blur evaluation processing, the registering processing, and the like are performed based on the high frequency components of the AF evaluation area, for detecting the AF evaluation value, assigned as the specific area in the image. Besides, for example, a central area of a frame or a face area of a main object may be assigned as the specific area, irrespective of the AF evaluation area. In the case of assigning the face area of the main object as the specific area, the still image display device 35 is provided with a face detector 37 to detect the face area from the in-focus image P1, as shown in FIG. 11. In calculating the blur evaluation value, the high frequency component analyzer 36 analyzes the high frequency components from the face area detected by the face detector 37.

As the still image display device, for example, a personal computer on which a still image display program is installed may be usable. The still image display device obtains the composite image file or the normal image file through the memory card 27 in the first embodiment, but may obtain an image file directly from the digital camera through a universal serial bus (USB) cable or the like, for example.

In the still image display device according to the first embodiment, the image is captured by the digital camera (imaging device), and the image file having this image is obtained through the memory card or the cable. In a second embodiment, the still image display device is installed in the digital camera.

Figure 12:
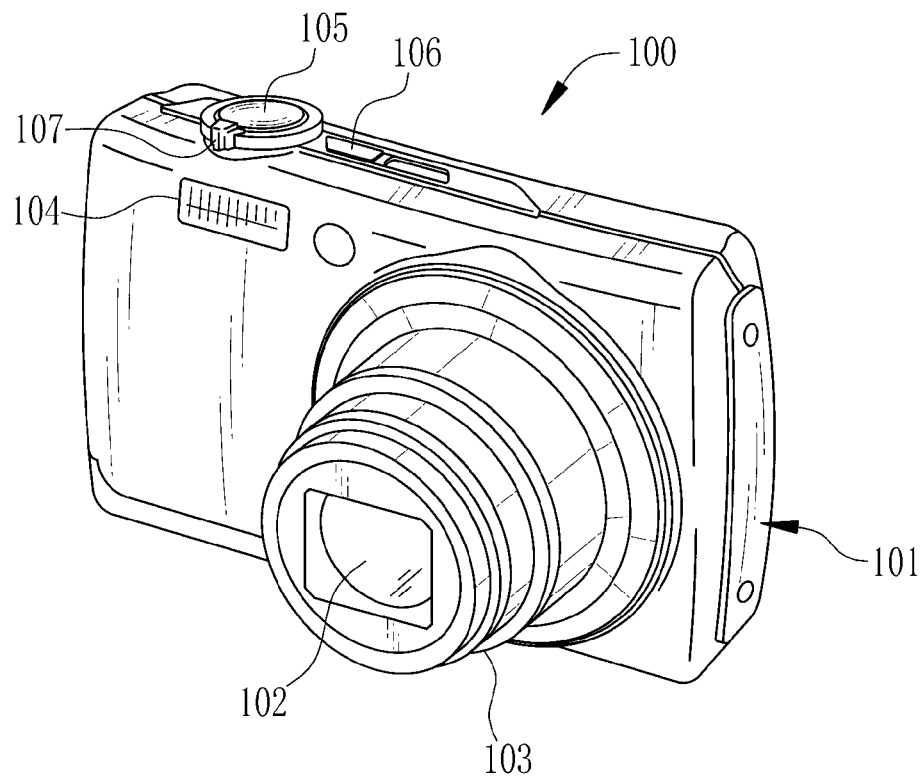
FIG. 12 is a front perspective view of a digital camera.

As shown in FIG. 12, a digital camera 100 has a camera body 101 formed in an approximately rectangular parallelepiped shape. The camera body 101 is provided at its front surface with a lens barrel 103 for holding an imaging optical system 102 and a flash lamp unit 104 for illuminating the object. The camera body 101 is provided at its top surface with a shutter release button 105 for commanding imaging, a power button 106 for switching between power-on and -off, and a zoom lever 107 for performing a zooming operation by which the imaging optical system 102 is shifted to a wide angle side or a telephoto side.

The shutter release button 105 is a two-step push button. A half push of the shutter release button 105 executes various types of imaging preparation processing. Upon a full push of the shutter release button 105 by pushing the button 105 more deeply, imaging processing is performed.

Figure 13:
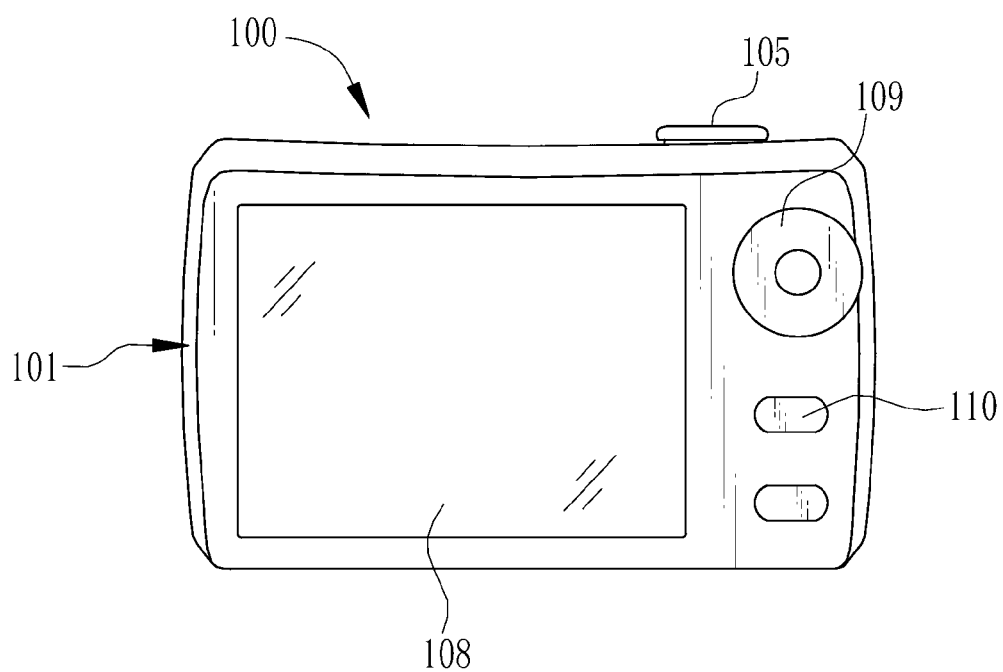
FIG. 13 is a rear perspective view of the digital camera.

As shown in FIG. 13, the camera body 101 is provided with a liquid crystal display (display unit) 108, a mode selection dial 109, and a menu button 110 at its rear surface. The liquid crystal display 108 displays a captured image, an observation image i.e. a so-called through-image during framing, various types of menu screens, and the like. The digital camera 100 has a plurality of operation modes including an imaging mode for capturing still images, a reproduction mode for displaying the captured images on the liquid crystal display 108, and the like. The operation mode of the digital camera 100 is sequentially switched by a push of the mode selection dial 109. The menu button 110 is operated to display various types of setting menus on the liquid crystal display 108.

In the imaging mode, the digital camera 100 is selectable between a normal imaging mode for storing a normal image file to a memory card 111 (see FIG. 14) and a special display imaging mode for storing a composite image file corresponding to the still image special display to the memory card 111. This selection is performed by displaying the setting menu on the liquid crystal display 108 by the operation of the menu button 110, and designating one of the normal imaging mode and the special display imaging mode on the menu.

The liquid crystal display 108 is provided with a touch panel 112 (see FIG. 14) in an overlaid manner. The touch panel 112 is attached such that the surface thereof is approximately coplanar to the rear surface of the camera body 101. Upon a touch of the surface of the touch panel 112 with a finger, a specific pen, or the like, the touch panel 112 detects the position of the finger from variation of capacitance and the like.

According to this digital camera 100, it is possible to perform an input operation including the setting of imaging functions, the switching of images to be displayed, and the like by means of touching the surface of the touch panel 112 with the finger and shifting the finger with keeping a state of touching in accordance with an icon or an image displayed in the liquid crystal display 108.

Figure 14:
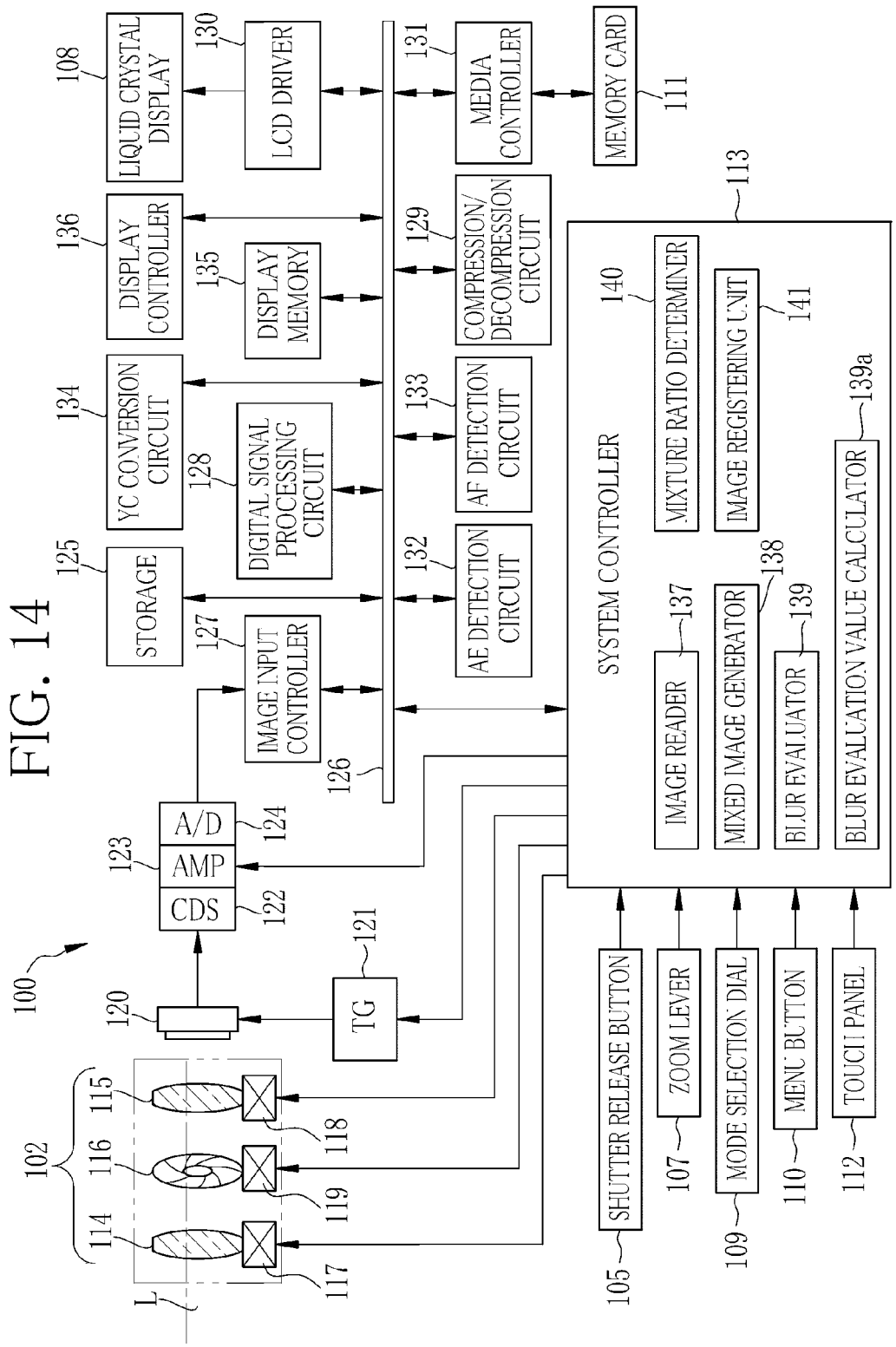
FIG. 14 is a schematic view showing the structure of a still image display device and an imaging device according to a second embodiment.

As shown in FIG. 14, a system controller 113 of the digital camera 100 sequentially executes various types of programs and data based on control signals from an operation unit having the shutter release button 105, the zoom lever 107, the mode selection dial 109, the menu button 110, and the touch panel 112, to control each part of the digital camera 100 in a centralized manner.

The imaging optical system 102 incorporates a zoom lens 114, a focus lens 115, an aperture stop 116, and the like. The zoom lens 114, driven by a zoom lens drive mechanism 117, is shifted forward and backward between a wide-end (wide angle end) and a tele-end (telephoto end) along an optical axis L. Thus, the magnification of the imaging optical system 102 varies. The focus lens 115 is shiftable between a long position for focusing on an object in a far position along the optical axis L and a short position for focusing on an object in a near position. During autofocus (AF) control, the focus lens 115 is driven by a focus lens drive mechanism 118, and set at an in-focus position. The aperture stop 116, driven by an aperture stop drive mechanism 119, varies an aperture stop value (an f number). Therefore, the amount of light that passes through the imaging optical system 102 and enters a CCD 120 is adjusted.

Behind the imaging optical system 102, there is disposed the CCD 120, which has an imaging surface for forming an image of object light passed through the imaging optical system 102 and performs photoelectric conversion of the object light received by the imaging surface. The CCD 120 is connected to the system controller 113 through a timing generator (TG) 121. This CCD 120 is an example of an imaging unit.

In the imaging mode, the system controller 113 makes the TG 121 produce a timing signal (clock pulses). The CCD 120 is driven by the timing signal (clock pulses) inputted from the TG 121. In the CCD 120, a shutter speed of an electronic shutter is determined from the timing signal (clock pulses) inputted from the TG 121.

An imaging signal outputted from the CCD 120 is inputted to a correlated double sampling circuit (CDS) 122, and outputted as a color signal of R, G, and B, which corresponds to the amount of electric charge accumulated in each cell of the CCD 120. The color signal is amplified by an amplifier (AMP) 123, and converted by an A/D converter 124 from the analog signal into a digital image signal.

An image input controller 127 is connected to the system controller 113 through a bus 126. Storage 125 is also connected to the bus 126. As the storage 125, an SDRAM is used, for example. The system controller 113 controls the image input controller 127 to store the image data outputted from the A/D converter 124 to the storage 125. Besides the image input controller 127 and the storage 125, a digital signal processing circuit 128, a compression/decompression circuit 129, an LCD driver 130, a media controller 131, an AE detection circuit 132, an AF detection circuit 133, and a YC conversion circuit 134 are connected to the bus 126.

The digital signal processing circuit 128 accesses the image data stored in the storage 125, and applies to the image data various types of image processing such as gradation conversion, white balance correction, and gamma correction. The YC conversion circuit 134 converts the image data subjected to the various types of image processing into a luminance signal Y and color difference signals Cr and Cb. Note that, in the case of displaying the through-image, image data (moving image data in an odd-number field and an even-number field) having lower resolution than in imaging is stored to the storage 125, and the above-described signal processing is applied to the low resolution image data. After that, the low resolution image data is read out of the storage 125 in accordance with a command from the system controller 113. In reading out the image data of one field, the image data of the next one field is written to the storage 125. The image data read out of the storage 125 is displayed through the LCD driver 130 on the liquid crystal display 108 as the through-image.

The AF detection circuit 133 is an integration circuit, which extracts a high frequency component of the image data and integrates the high frequency component. Upon the half push of the shutter release button 105, the AF detection circuit 133 calculates the AF evaluation value, being an integrated value of the high frequency component, from the image data stored in the storage 125 and outputs this AF evaluation value to the system controller 113, while shifting the focus lens 115 in an optical axis direction. Also during displaying the through-image, the AF detection circuit 133 calculates the AF evaluation value at predetermined intervals, for example, every second, for the purpose of AF control.

The system controller 113 composes an in-focus position detector together with the AF detection circuit 133. The system controller 113 controls the focus lens drive mechanism 118 to shift the focus lens 115 and sequentially obtains the AF evaluation value at each position of the focus lens 115, and functions as a judging unit for judging the position of the focus lens 115 in which the AF evaluation value is maximized (peaks). In other words, the system controller 113 sequentially obtains the AF evaluation value from the AF detection circuit 133 during the shift of the focus lens 115, and judges as the in-focus position the position of the focus lens 115 in which the AF evaluation value is maximized (peaks), and sets the focus lens 115 in this in-focus position. The system controller 113 also detects the position of the focus lens 115 from a pulse number i.e. the number of pulses of a pulse motor that composes the focus lens drive mechanism 118. For example, the pulse number increases with the shift of the focus lens 115 to the short position side, and decreases with the shift of the focus lens 115 to the long position side.

In a case where the digital camera 100 is in the special display imaging mode, the identical object is imaged in the in-focus position, a front out-of-focus position, and a rear out-of-focus position. Therefore, the system controller 113 makes the focus lens 115 shift to the in-focus position in which the AF evaluation value is maximized, as described above, and performs imaging processing. After that, while counting the pulse number, the system controller 113 makes the focus lens 115 shift to the front out-of-focus position, being a predetermined distance away from the in-focus position to the short position side, and performs the imaging processing. The system controller 113 makes the focus lens 115 shift to the rear out-of-focus position, being a predetermined distance away from the in-focus position to the long position side, and performs the imaging processing.

Note that, the AF detection circuit 133 may calculate the AF evaluation value in the entire frame of the image, or in a specific area designated automatically. Furthermore, the area may be designated manually by a camera user. Note that, in a case where the specific area is designated as the AF evaluation area in which the AF evaluation value is calculated, the AF evaluation value is calculated from the same AF evaluation area in the in-focus image and the out-of-focus images.

In the case of designating the calculation area of the AF evaluation value by the user of the digital camera 100, for example, when the through-image is displayed in the imaging mode, the user touches an arbitrary position in the touch panel 112, so that an area of certain size including the position touched by the user is designated as the specific area.

The AE detection circuit 132 has a light metering circuit for measuring object brightness based on the image data stored in the storage 125 upon the half push of the shutter release button 105, a detection circuit for detecting an AE evaluation value in accordance with the object brightness to designate an optimal exposure value, and the like, and outputs the AE evaluation value to the system controller 113. The system controller 113 sets the exposure value (an f number of the aperture stop 116 and an electronic shutter speed of the CCD 120) based on the AE evaluation value.

Note that, in a case where the digital camera 100 is in the special display imaging mode, the system controller 113 sets the f number at a certain reference f number FK or less in order to obtain proper blurriness in the out-of-focus position. This reference f number FK is a value that shallows the depth of field of the imaging optical system. In this embodiment, the system controller 113 compares an f number FS based on the AE evaluation value with the reference f number FK. In a case where the f number FS is the reference f number FK or less, the f number FS and the electronic shutter speed based on the AE evaluation value are used as is. In a case where the f number FS is more than the reference f number FK, the f number is reset at the reference f number FK, and the electronic shutter speed is reset at a faster value by a decrease of the f number.

Upon the zooming operation of the zoom lever 107, the system controller 113 controls the zoom lens drive mechanism 117 to shift the zoom lens 114 to the telephoto side or the wide angle side. The system controller 113 functions as a zoom position detector for detecting the zoom position of the zoom lens 114, and detects the zoom position by counting the drive pulse number of the pulse motor composing the zoom lens drive mechanism 117. For example, the pulse number is added in shifting the zoom lens 114 to the telephoto side, and subtracted in shifting the zoom lens 114 to the wide angle side.

In the imaging mode, upon turning on a first-step switch by the half push of the shutter release button 105, an imaging preparation operation such as the AE control and the AF control as described above is performed. In the imaging mode, one of the normal imaging mode and the special display imaging mode is chosen. Provided that the special display imaging mode is chosen, the full push of the shutter release button 105 from the half push thereof triggers the CCD 120 to image the object and obtain the in-focus image at the exposure value set by the AE control in a state of setting the focus lens 115 in the in-focus position by the AF control. Then, the focus lens 115 shifts to the front out-of-focus position, and the CCD 120 captures the front focus image with the same exposure value as the in-focus image. Furthermore, the focus lens 115 shifts to the rear out-of-focus position, and the rear focus image is obtained with the same exposure value as the in-focus image. The in-focus image, the front focus image, and the rear focus image are still frame images and hence have higher resolution than the through-image being a field image.

The storage 125 stores an in-focus image P1, a front focus image P2, and a rear focus image P3. These images P1, P2, and P3 are subjected to the above-described signal processing, and compressed in a predetermined compression format (for example, a JPEG format) by the compression/decompression circuit 129. After the compression processing, the images P1, P2, and P3 are integrated into one composite image file, and stored to the memory card 111 through the media controller 131.

In storing the composite image file to the memory card 111, the system controller 113 adds the AF evaluation value, the AF evaluation area, the exposure value, the zoom position, and the like as additional information.

In the reproduction mode, the image file is temporarily read out of the memory card 111 to the storage 125 through the media controller 131. Then, after the image file is subjected to the compression processing by the compression/decompression circuit 129, the image file is outputted to the LCD driver 130 and displayed on the liquid crystal display 108.

To the system controller 113, a display memory 135, a display controller 136, and the like are connected through the bus 126. Since the display memory 135 and the display controller 136 function in the same manner as the display memory 14 and the display controller 15 described in the first embodiment, the expression thereof is omitted.

The choice of the reproduction mode runs the still image display program stored in a not-shown memory. The system controller 113 functions as an image reader 137, a mixed image generator 138, a blur evaluator 139, a blur evaluation value calculator 139a, a mixture ratio determiner 140, and an image registering unit 141. Since these components function in the same manner as the image reader 16, the mixed image generator 17, the blur evaluator 18, the blur evaluation value calculator 18a, the mixture ratio determiner 19, and the image registering unit 20 described in the first embodiment, the expression thereof is omitted.

Figure 15:
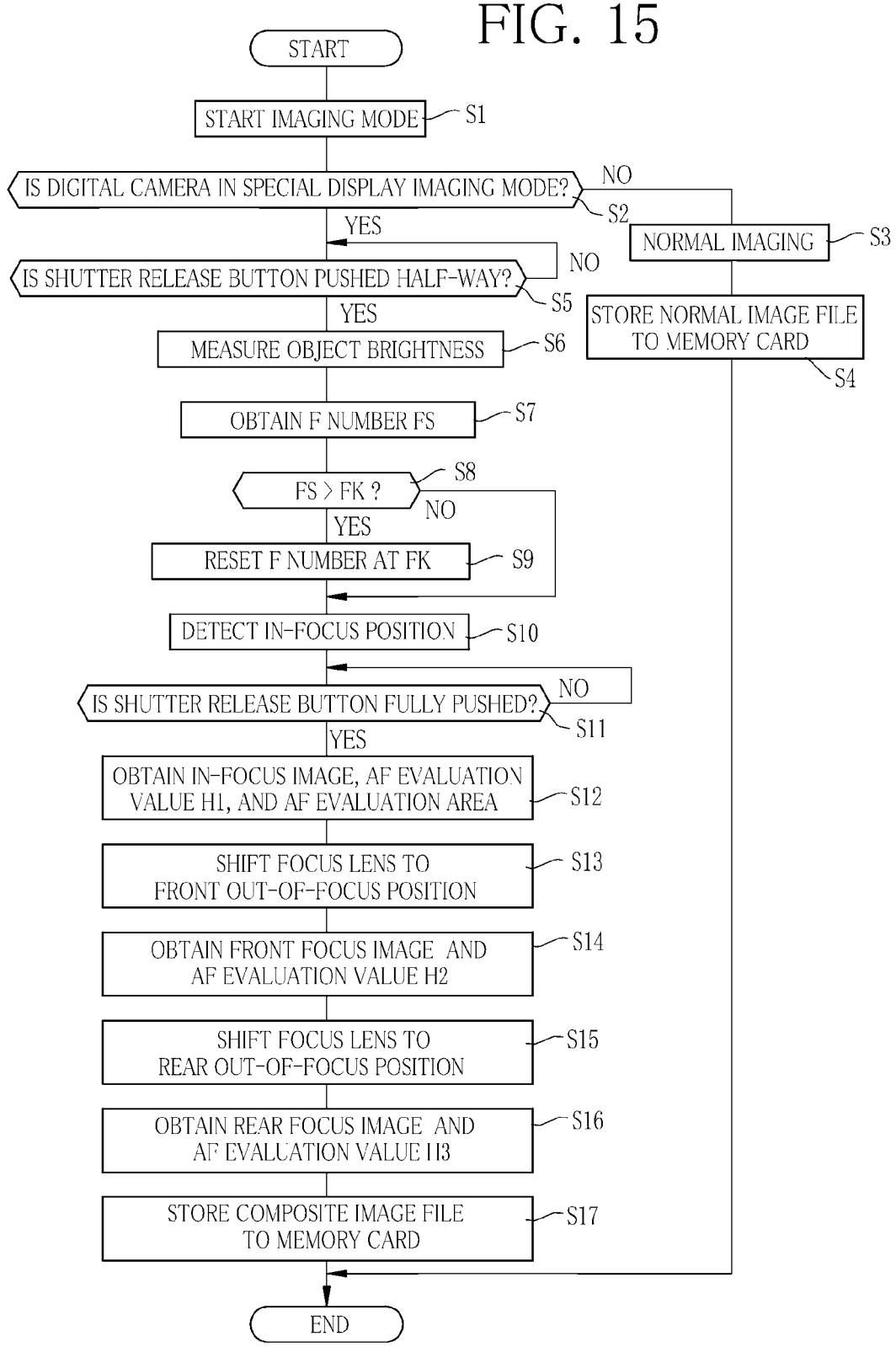
FIG. 15 is a flowchart showing a procedure in which the imaging device according to the second embodiment performs imaging for special display.

Next, the imaging processing of the digital camera 100 will be described with the use of a flowchart of FIG. 15. Upon powering on the digital camera 100 and choosing the imaging mode (S1), the through-image is displayed on the liquid crystal display 108. The system controller 113 confirms whether or not the special display imaging mode is chosen, and then is put into an imaging standby state (YES in S2).

In a case where the special display imaging mode is not chosen (NO in S2), the digital camera 100 is in the normal imaging mode (S3). In the normal imaging mode, the normal image file is stored to the memory card 111 (S4), just as in the case of capturing a general still image. At this time, information about the still image special display off is also stored as the additional information.

Provided that the special display imaging mode is chosen, the system controller 113 judges whether or not the shutter release button 105 is pushed half-way (S5). In a case where the shutter release button 105 is judged not to be pushed half-way, the imaging standby state is continued until the shutter release button 105 is pushed half-way. In this imaging standby state, the CCD 120 captures the through-image and displays the through-image on the liquid crystal display 108. During the display of the through-image, the AF detection circuit 133 performs the AF control at predetermined time intervals.

In a case where the shutter release button 105 is pushed half-way (YES in S5), the system controller 113 performs the imaging preparation operation. In this imaging preparation operation, the system controller 113 first controls the AE detection circuit 132 to perform measurement processing of the object brightness (S6). In this measurement processing, the AE evaluation value is calculated based on the image data stored in the storage 125, and outputted to the system controller 113. The system controller 113 calculates the exposure value based on the AE evaluation value, and determines the f number FS of the aperture stop 116 and the electronic shutter speed of the CCD 120 (S7).

After the determination of the f number of the aperture stop 116 and the electronic shutter speed of the CCD 120, the system controller 113 compares the f number FS with the reference f number FK (S8). In a case where the f number FS is the reference f number FK or less (NO in S8), the f number FS and the electronic shutter speed are used as is. In a case where the f number FS is more than the reference f number FK (YES in S8), the f number is reset at the reference f number FK, and the electronic shutter speed is reset at a higher value (S9).

After the setting of the f number of the aperture stop 116 and the electronic shutter speed of the CCD 120, the CCD 120 performs imaging under this exposure setting, and the image data is captured to the storage 125. At this time, the system controller 113 controls the AF detection circuit 133 to perform the AF processing, while shifting the focus lens 115 between the long position and the short position by controlling the focus lens drive mechanism 118. The AF detection circuit 133 calculates the AF evaluation value based on the image data inputted to the storage 125 at each position of the focus lens 115, and sequentially outputs this AF evaluation value to the system controller 113. The system controller 113 sequentially obtains the AF evaluation value from the AF detection circuit 133, and detects the in-focus position in which the AF evaluation value is maximized (peaks) (S10).

After that, the system controller 113 judges whether or not the shutter release button 105 is fully pushed (S11). In a case where the shutter release button 105 is judged not to be fully pushed, the imaging standby state is continued until the full push. In a case where the shutter release button 105 is fully pushed (YES in S11), the system controller 113 controls the CCD 120 to capture the object light at the exposure value set by the AE control in such a state that the focus lens 115 is in the in-focus position to obtain the in-focus image P1. The AF evaluation value and the AF evaluation area at the time of obtaining the in-focus image P1 are temporarily stored to the storage 125 (S12).

After the in-focus image P1, the AF evaluation value, and the AF evaluation area are stored to the storage 125, the system controller 113 counts the pulse number with shifting the focus lens 115 to the short position side, so that the focus lens 115 is shifted to the front out-of-focus position (S13). Then, the system controller 113 makes the CCD 120 image the object at the same exposure value as in the in-focus position in the state of disposing the focus lens 115 in the front out-of-focus position, to obtain the front focus image P2. The AF evaluation value at the time of obtaining the front focus image P2 is stored to the storage 125 (S14).

After capturing the front focus image, the system controller 113 counts the pulse number with shifting the focus lens 115 to the long position side, so that the focus lens 115 is shifted to the rear out-of-focus position (S15). Then, the system controller 113 obtains the rear focus image P3 by using the CCD 120 at the same exposure value as in the in-focus position in the state of disposing the focus lens 115 in the rear out-of-focus position. The AF evaluation value at the time of obtaining the rear focus image P3 is temporarily stored to the storage 125 (S16). After that, the system controller 113 controls the digital signal processing circuit 128 to apply the various types of signal processing to the in-focus image P1, the front focus image P2, and the rear focus image P3 stored in the storage 125, and also controls the compression/decompression circuit 129 to apply the compression processing to the in-focus image P1, the front focus image P2, and the rear focus image P3.

The system controller 113 controls the media controller 131 to write to the memory card 111 the composite image file into which the compressed in-focus image P1, the compressed front focus image P2, and the compressed rear focus image P3 and the additional information including the AF evaluation values H1, H2, and H3 and the AF evaluation area at the time of obtaining the images P1, P2, and P3 are integrated (S17). At this time, the information about the still image special display on is also stored as the additional information.

In the case of choosing the reproduction mode, the digital camera 100 selectively performs the still image special display, in which the composite image file stored in the memory card 111 is read out and the plurality of mixed images are produced by mixing the in-focus image and the out-of-focus images and sequentially displayed, or the normal display, in which the normal image file is read out and only the one in-focus image is displayed. The digital camera 100 performs the image display in the reproduction mode in the same procedure as the flowchart according to the first embodiment.

As described above, the digital camera 100 produces the composite image file that includes the in-focus image P1, the front focus image P2, the rear focus image P3, and the additional information having the AF evaluation values and the AF evaluation area at the time of obtaining the images P1, P2, and P3 and the information about the still image special display on. With the use of this composite image file, the still image special display can be performed on the liquid crystal display 108 of the digital camera 100. Also, the still image special display may be performed in the still image display device 10 (see FIG. 1) separate from the digital camera 100 through the memory card 111.

In the case of a still image display device that does not accommodate the still image special display, since the memory card 111 stores the in-focus image too, the still image display device performs the normal display of the still image by reading out the in-focus image.

Also, since the digital camera 100 controls the f number within the reference f number in the exposure control, the front focus image P2 and the rear focus image P3 can be appropriately blurred with respect to the in-focus image P1. Accordingly, in producing the front focus mixed image and the rear focus mixed image from the in-focus image P1, the front focus image P2, and the rear focus image P3, the mixed images having no incongruity with less variation in blurriness can be obtained. Therefore, it is possible to perform the still image special display that is easy to see for the user. Also, since the blur evaluation value is calculated based on the AF evaluation values extracted from the same specific area in the in-focus image P1, the front focus image P2, and the rear focus image P3, it is possible to evaluate blurriness with high precision.

Note that, according to the second embodiment, the f number is always controlled within the constant reference f number FK in the exposure control. However, for example, the position of the focus lens 115 may be detected, and the reference f number FK may be varied in accordance with the position of the focus lens 115. Instead of or in addition to this, the position of the zoom lens 114 may be detected, and the reference f number FK may be varied in accordance with the magnification of the imaging optical system 102. Furthermore, a shift distance of the focus lens 115 from the in-focus position to the out-of-focus position may not be constant, but may be varied in accordance with the magnification of the imaging optical system 102.

In the second embodiment, in writing the composite image file to the memory card 111, the AF evaluation values H1, H2, and H3 at the time of obtaining the in-focus image P1, the front focus image P2, and the rear focus image P3, respectively, are stored as the additional information. Instead of this, the blur evaluation values H2/H1 and H3/H1 may be calculated in advance, and the blur evaluation values may be stored as the additional information. In this case, it becomes unnecessary to calculate the blur evaluation values on the occasion of the still image special display, and therefore it is possible to shorten processing to blur evaluation.

Also, in the special display imaging mode according to the second embodiment, the composite image file into which the in-focus image P1, the front focus image P2, the rear focus image P3, and the additional information are integrated is stored to the memory card 111. However, as described in the first embodiment, the in-focus image P1, one of the front focus image and the rear focus image, and the additional information may be integrated into one composite image file and stored to the memory card 111.

In the second embodiment, the in-focus image P1, the front focus image P2, and the rear focus image P3 are stored to the memory card 111 after the entire frame thereof is compressed. In the still image special display, the mixed images are produced after the compressed in-focus image P1, the compressed front focus image P2, and the compressed rear focus image P3 are subjected to decompression processing. Instead of this, a specific area of each of the in-focus image P1, the front focus image P2, and the rear focus image P3 may be stored as uncompressed images, and the mixed images may be produced from images in which the specific areas are replaced with the uncompressed images.

Figure 16:
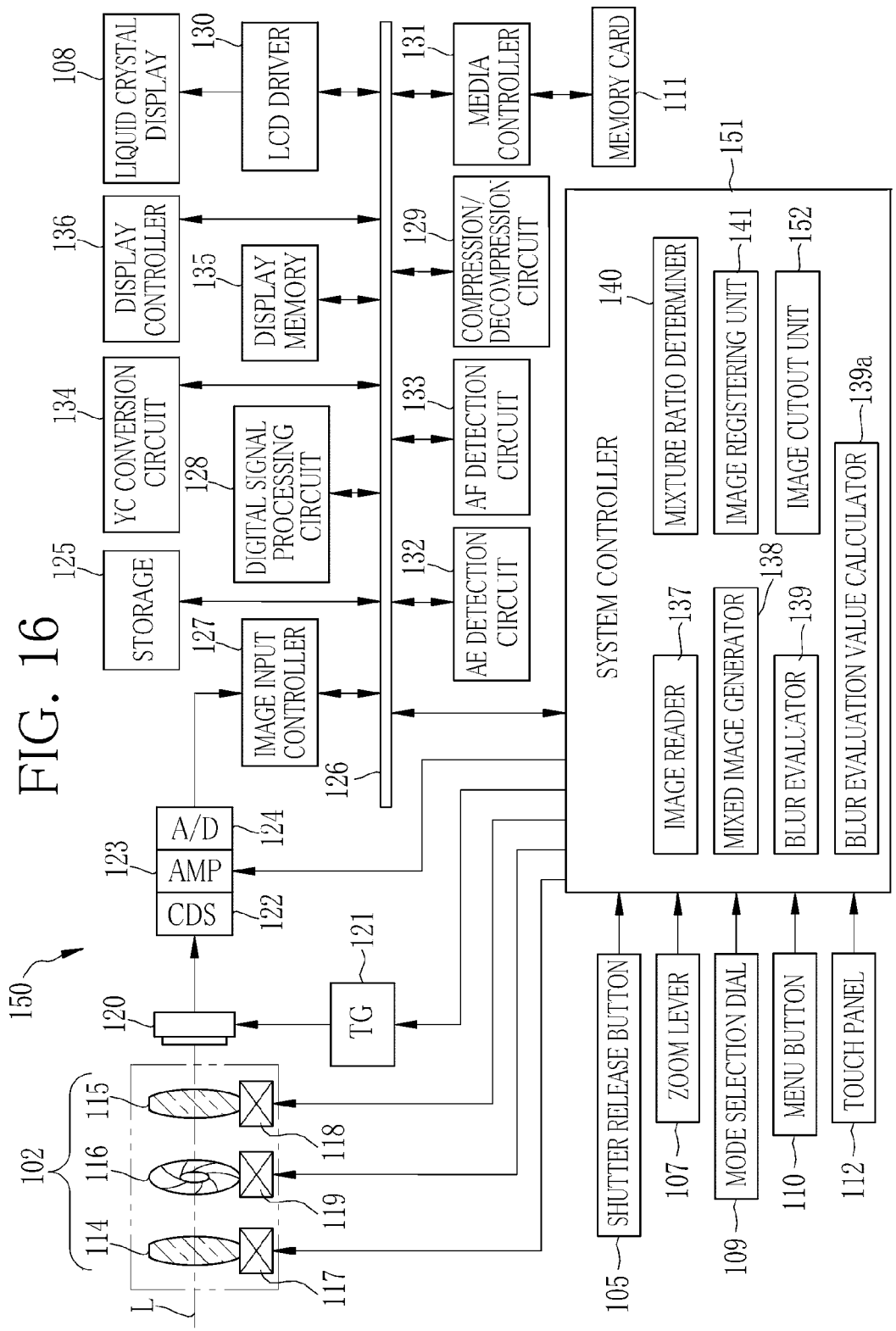
FIG. 16 is a schematic view showing the structure of a still image display device and an imaging device according to a third embodiment.

As shown in FIG. 16, in a digital camera 150 according to a third embodiment, a system controller 151 has the function of an image cutout unit 152. This system controller 151 controls each part of the digital camera 150 in a centralized manner, just as with the system controller 113 according to the second embodiment, and functions by running the still image display program as the image reader 137, the mixed image generator 138, the blur evaluator 139, the blur evaluation value calculator 139*a*, the mixture ratio determiner 140, and the image registering unit 141. Note that, the same reference numbers as the reference numbers of the digital camera 100 according to the above-described second embodiment denote the same components, and the description thereof will be omitted.

In obtaining the in-focus image P1, the front focus image P2, and the rear focus image P3 with high resolution, the system controller 151 controls the image cutout unit 152 to cut out and copy a specific area of each of the in-focus image P1, the front focus image P2, and the rear focus image P3 in the state of not being subjected to the compression processing (uncompressed state). Note that, in this case, the specific area in the same position of each of the in-focus image P1, the front focus image P2, and the rear focus image P3 is cut out and copied. In this embodiment, the AF evaluation area at the time of obtaining the in-focus image P1, the front focus image P2, and the rear focus image P3 is used as the specific area.

The system controller 151 makes the storage 125 store the copied and uncompressed-state specific area of each of the in-focus image P1, the front focus image P2, and the rear focus image P3, as uncompressed images. After the completion of the cutout and copy by the image cutout unit 152, the system controller 151 controls the compression/decompression circuit 129 to compress the in-focus image P1, the front focus image P2, and the rear focus image P3 in a predetermined format.

Figure 17:
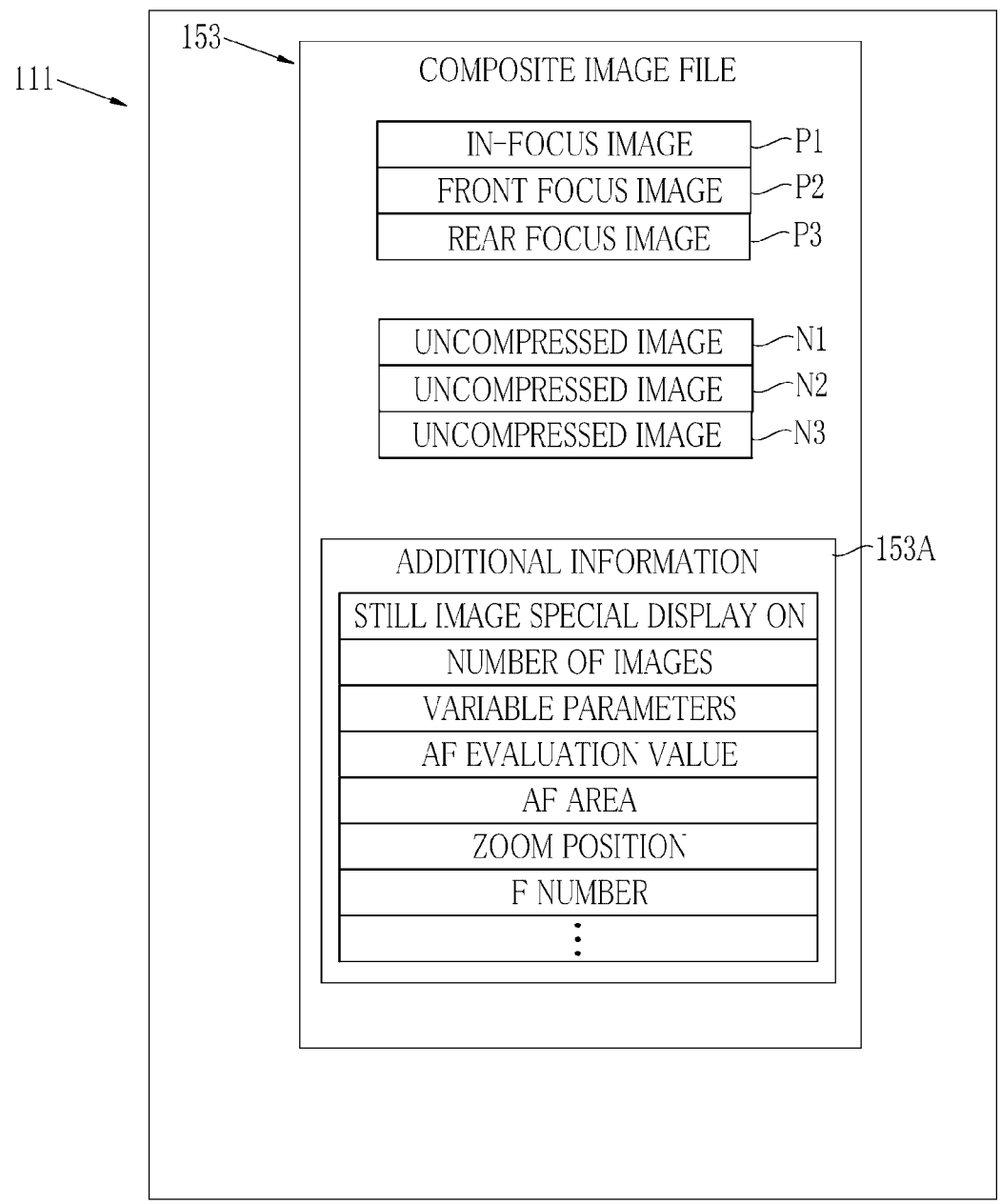
FIG. 17 is an explanatory view showing the structure of a composite image file.

As shown in FIG. 17, the system controller 151 controls the media controller 131 to store the compressed in-focus image P1, the compressed front focus image P2, the compressed rear focus image P3, an uncompressed in-focus image N1, an uncompressed front focus image N2, an uncompressed rear focus image N3, and additional information 153A at the time of obtaining these images as one composite image file 153 to the memory card 111. At this time, the system controller 151 makes the memory card 111 store the AF evaluation area at the time of obtaining the in-focus image P1, the front focus image P2, and the rear focus image P3 as positional information on the specific area in the state of being included in the additional information.

In reading out the composite image file 153 from the memory card 111, the system controller 151 reads out and decompresses the compressed in-focus image P1, the compressed front focus image P2, and the compressed rear focus image P3. At the same time, the system controller 151 reads out the uncompressed images N1, N2, and N3 and the information about the AF evaluation area as the positional information of the specific area.

Figure 18A:
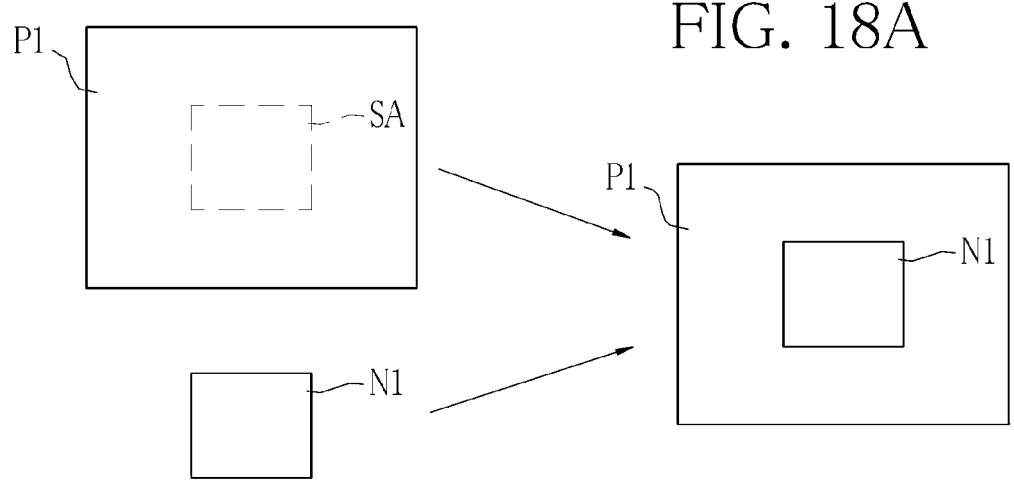
FIG. 18A is an explanatory view showing the case of replacing a specific area of an in-focus image of the third embodiment with an uncompressed image.
Figure 18B:
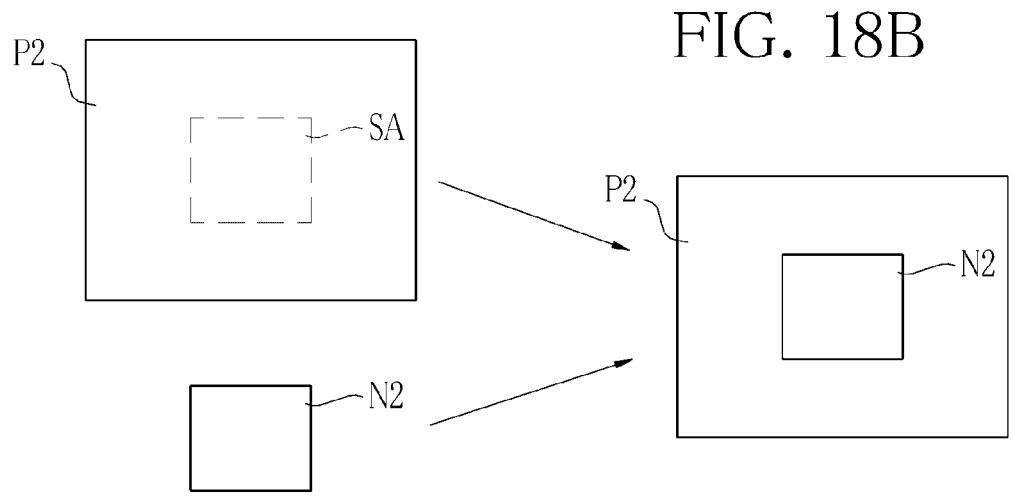
FIG. 18B is an explanatory view showing the case of replacing a specific area of a front focus image of the third embodiment with an uncompressed image.
Figure 18C:
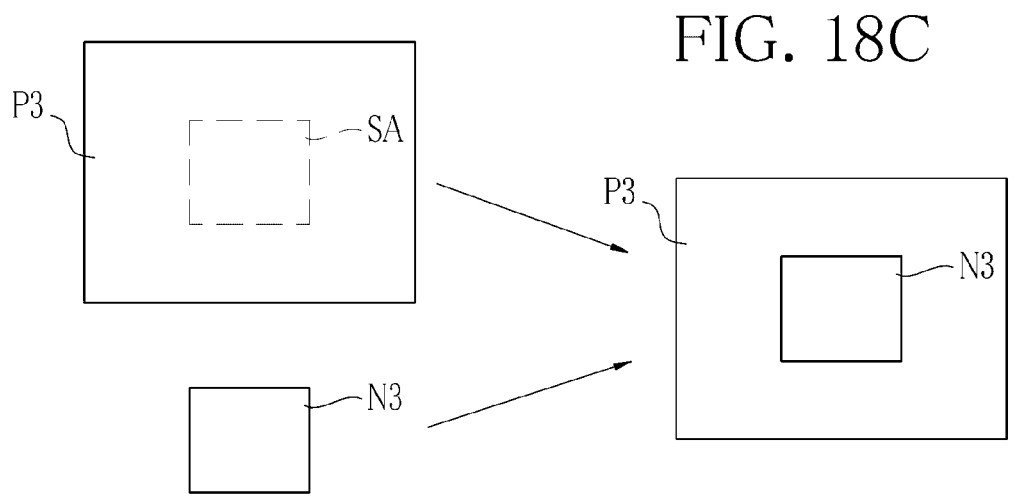
FIG. 18C is an explanatory view showing the case of replacing a specific area of a rear focus image of the third embodiment with an uncompressed image.

As shown in FIGS. 18A to 18C, the system controller 151 replaces specific areas SA in frames of the decompressed in-focus image P1, the decompressed front focus image P2, and the decompressed rear focus image P3 with the uncompressed images N1, N2, and N3, respectively, based on the positional information on the specific area SA. The system controller 151 uses the in-focus image P1, the front focus image P2, and the rear focus image P3 in which the specific areas are replaced with the uncompressed images N1, N2, and N3, for the blur evaluation, the production of the mixed images, the image registration, and the still image special display.

The imaging processing by the digital camera 150 will be described with referring to a flowchart of FIG. 19. Note that, the steps of starting the imaging mode (S1), imaging in the special display imaging mode (S2), obtaining the in-focus image P1, the front focus image P2, and the rear focus image P3 (S5 to S7), and the normal imaging mode (S3 and S4) are the same as the steps of the digital camera 100 according to the second embodiment, and the description thereof will be omitted.

After the obtainment of the rear focus image P3 (S7), the system controller 151 applies various types of signal processing to the in-focus image P1, the front focus image P2, and the rear focus image P3 stored in the storage 125. After this, the system controller 151 controls the image cutout unit 152 to copy and store the AF evaluation area of each of the uncompressed in-focus image P1, the uncompressed front focus image P2, and the uncompressed rear focus image P3, as the uncompressed images (S8).

After the copy of the AF evaluation area, the system controller 151 controls the compression/decompression circuit 129 to apply the compression processing to the in-focus image P1, the front focus image P2, and the rear focus image P3. After the compression processing, the system controller 151 controls the media controller 131 to store the compressed in-focus image P1 of one frame, the compressed front focus image P2 of one frame, the compressed rear focus image P3 of one frame, the uncompressed in-focus image N1, the uncompressed front focus image N2, the uncompressed rear focus image N3, and the additional information including the AF evaluation area at the time of obtaining the images, as the one composite image file 153 to the memory card 111. At this time, information about the still image display on is also stored as the additional information.

The image display will be described with the use of a flowchart of FIG. 20. The reproduction mode is chosen by the image display operation with the mode selection dial 109 (S1). The system controller 151 commands readout to the image reader 16. The image reader 16 reads out the first composite image file 153 or the first normal image file 29 from the memory card 111 (S2).

Then, the system controller 151 reads out the information about the still image special display on/off from the additional information (S3). In a case where the sill image special display on is stored (YES in S4), the in-focus image P1, the front focus image P2, and the rear focus image P3 are read out of the composite image file 153 and subjected to the decompression processing, to perform the still image special display (S5). Note that, in a case where the still image special display off is stored (NO in S4), the normal display is performed (S6 and S7), just as with the first embodiment.

After the readout and the decompression processing of the in-focus image P1, the front focus image P2, and the rear focus image P3 (S5), the system controller 151 reads out the uncompressed images N1, N2, and N3 (S8), and reads out the information about the AF evaluation area as the positional information about the specific area (S9). Based on the positional information, the system controller 151 replaces the specific areas in the frames of the decompressed in-focus image P1, the decompressed front focus image P2, and the decompressed rear focus image P3 with the uncompressed images N1, N2, and N3, respectively (S10). After this, the blur evaluation is performed just as with the first embodiment. The mixed images are produced (S11), and the still image special display is performed (S12).

As described above, since the specific area of each of the in-focus image P1, the front focus image P2, and the rear focus image P3 is replaced with the uncompressed image, there is no degradation such as compression distortion owing to the compression processing in the specific area. Therefore, the mixed images produced from these images have no degradation and high precision. Also, in performing the image registering processing before the mixed image production processing, the characteristic point is extracted from the specific area replaced with the uncompressed image having less degradation, and therefore it is possible to improve precision in the image registering processing. Furthermore, since the mixed images are produced from the in-focus image P1, the front focus image P2, and the rear focus image P3 that are subjected to the precise image registering processing, it is possible to prevent the occurrence of flickers in pixels and actualize the easy-to-see display for the user, on the occasion of sequentially displaying the mixed images in the still image special display.

Figure 21:
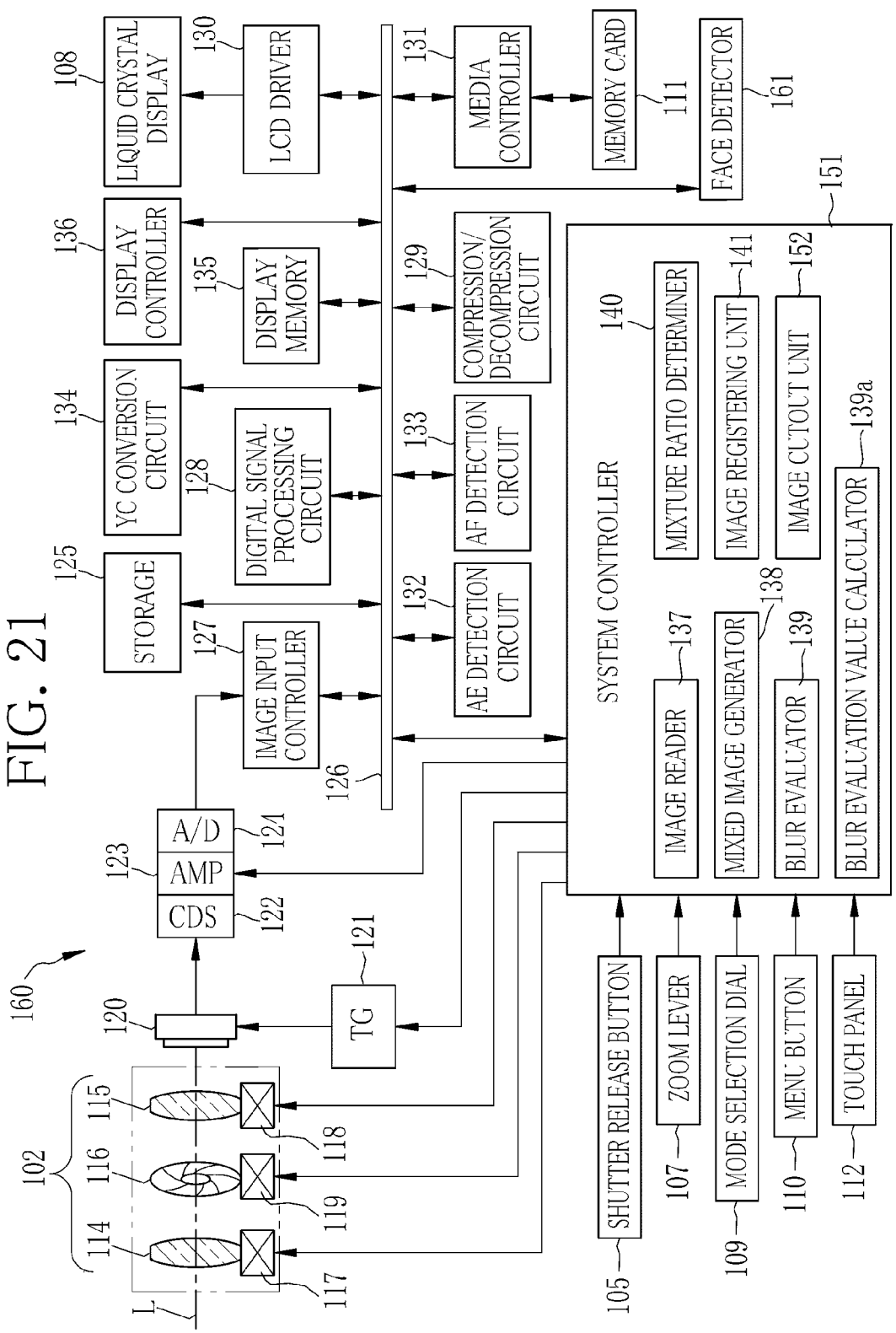
FIG. 21 is a schematic view showing the structure of a modification example of the digital camera.

According to the second and third embodiments, the AF evaluation area for detecting the AF evaluation value therein is assigned as the specific area in the image, and the blur evaluation processing, the image registering processing, the replacement processing with the uncompressed image, and the like are performed based on the high frequency component in the AF evaluation area, but the present invention is not limited to this. For example, a central area of the frame or a face area of a main object may be assigned as the specific area, irrespective of the AF evaluation area. In the case of assigning the face area of the main object as the specific area, as shown in FIG. 21, a digital camera 160 is provided with a face detector 161. With the use of the face detector 161, the face area detected from the in-focus image is assigned as the specific area and used in the blur evaluation processing, the image registering processing, analysis of the high frequency component, and the replacement with the uncompressed image.

There are two types of mixture ratio sets in the above embodiments, but the number of the types of mixture ratio sets may be increased to three or more in the case of ranking the degree of blurriness on a scale of three or more.

The PC or the digital camera is described as the still image display device in each of the above embodiments, but the present invention is not limited thereto and is applicable to a cellular phone, a smart phone, and the like. Also, the still image display device is incorporated into the digital camera in the second and third embodiments. However, the digital camera may be independently separated into an imaging device and the still image display device, and constitute a still image display system.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A still image display device comprising:
   a recording medium for recording an in-focus image and an out-of-focus image obtained by imaging an identical object;
   the still image display device performing the functions of:
      reading said in-focus image and said out-of-focus image from said recording medium,
      calculating a blur evaluation value based on a difference between high frequency components contained in said in-focus image and said out-of-focus image,
      evaluating the degree of blurriness of said out-of-focus image relative to said in-focus image by comparing said blur evaluation value with a predetermined reference value,
      choosing a first mixture ratio set in a case where said blur evaluation value is evaluated to be equal to or more than said reference value, and choosing a second mixture ratio set in a case where said blur valuation value is evaluated to be less than said reference value, provided that said first mixture ratio set refers to one set having a gradually varying mixture ratio for mixing said in-focus image and said out-of-focus image, and said second mixture ratio set refers to one set having a higher mixture ratio of said in-focus image and a lower mixture ratio of said out-of-focus image than said first mixture ratio set, and
      generating a plurality of mixed images from said in-focus image and said out-of-focus image read out of said recording medium in accordance with a chosen one of said first and second mixture ratio sets;
   a display that displays said mixed images; and
   a display controller that sequentially displays said plurality of mixed images on said display.

2. The still image display device according to claim 1, wherein said display controller sequentially displays said plurality of mixed images on said display in order of increasing a mixture ratio of said in-focus image from a low value to a high value, or in order of decreasing said mixture ratio of said in-focus image from said high value to said low value.

3. The still image display device according to claim 2, wherein said display controller alternately repeats the display in the increasing order and the display in the decreasing order.

4. The still image display device according to claim 3, wherein each of said mixture ratio of said in-focus image and a mixture ratio of said out-of-focus image varies in the range of 0% to 100%.

5. The still image display device according to claim 2, wherein said out-of-focus image includes two types of images, i.e. a front focus image obtained by focusing on a short position relative to an in-focus position at the time of obtaining said in-focus image, and a rear focus image obtained by focusing on a long position relative to said in-focus position.

6. The still image display device according to claim 5, further generating a plurality of front focus mixed images from said in-focus image and said front focus image, and a plurality of rear focus mixed images from said in-focus image and said rear focus image; and said display controller displays said plurality of front focus mixed images in the increasing order on said display, and then displays said plurality of rear focus mixed images in the decreasing order.

7. The still image display device according to claim 6, wherein each of a mixture ratio between said in-focus image and said front focus image and a mixture ratio between said in-focus image and said rear focus image varies in the range of 0% to 100%.

8. The still image display device according to claim 1, further performing the function of analyzing said high frequency component from said in-focus image and said out-of-focus image.

9. The sill image display device according to claim 1, wherein said high frequency component is included in advance in said in-focus image and said out-of-focus image.

10. The still image display device according to claim 1, further configured to perform a function of registering processing of said out-of-focus image relative to said in-focus image; and wherein
    said mixed image generator uses said out-of-focus image after being subjected to said registering processing.

11. The still image display device according to claim 1, wherein said display controller switches image display with fading processing by which a preceding display fades out while a following display fades in.

12. The still image display device according to claim 11, wherein said display controller displays said mixed image having a mixture ratio of 100% of said in-focus image for longer time than the other of said mixed images.

13. An imaging device comprising:
    an imaging optical system having a focus lens shiftable in an optical axis direction;
    an imaging unit that captures an in-focus image and an out-of-focus image of an identical object through said imaging optical system;
    a focus lens driver that shifts said focus lens to said optical axis direction during focus control;
    the imaging device performing the functions of:
    calculating a focus evaluation value in each position of said focus lens during said focus control based on a high frequency component of an image captured by said imaging unit;
    detecting an in-focus position based on said focus evaluation value;
    controlling said focus lens driver to set said focus lens at said in-focus position and an out-of-focus position a predetermined distance away from said in-focus position, so that said imaging unit captures said in-focus image and said out-of-focus image; and
    writing to a recording medium a high frequency component in a specific area of said in-focus image and said out-of-focus image as additional information, together with said in-focus image and said out-of-focus image; and
    a still image display device including:
    said recording medium;
      the still image display device performing the functions of:
      reading said in-focus image and said out-of-focus image from said recording medium,
      calculating a blur evaluation value based on a difference between said high frequency components contained in said in-focus image and said out-of-focus image, evaluating the degree of blurriness of said out-of-focus image relative to said in-focus image by comparing said blur evaluation value with a predetermined reference value, choosing a first mixture ratio set in a case where said blur evaluation value is evaluated to be equal to or more than said reference value, and choosing a second mixture ratio set in a case where said blur evaluation value is evaluated to be less than said reference value, provided that said first mixture ratio set refers to one set having a gradually varying mixture ratio for mixing said in-focus image and said out-of-focus image, and said second mixture ratio set refers to one set having a higher mixture ratio of said in-focus image and a lower mixture ratio of said out-of-focus image than said first mixture ratio set, and generating a plurality of mixed images from said in-focus image and said out-of-focus image read out of said recording medium in accordance with a chosen one of said first and second mixture ratio sets;

a display that displays said mixed images; and a display controller that sequentially displays said plurality of mixed images on said display.

14. A still image display system comprising:

A. an imaging device including:

an imaging optical system having a focus lens shiftable in an optical axis direction;

an imaging unit that captures an in-focus image and an out-of-focus image of an identical object through said imaging optical system;

a focus lens driver that shifts said focus lens to said optical axis direction during focus control;

the image display device performing the functions of:

calculating a focus evaluation value in each position of said focus lens during said focus control based on a high frequency component of an image captured by said imaging unit;

detecting an in-focus position based on said focus evaluation value;

controlling said focus lens driver to set said focus lens at said in-focus position and an out-of-focus position a predetermined distance away from said in-focus position, so that said imaging unit captures said in-focus image and said out-of-focus image; and writing to a recording medium a high frequency component in a specific area of said in-focus image and said out-of-focus image as additional information, together with said in-focus image and said out-of-focus image; and B. a still image display device including:

the still image display device performing the functions of:

reading out said in-focus image, said out-of-focus image, and said additional information from said recording medium, calculating a blur evaluation value based on a difference between said high frequency components included in said additional information, evaluating the degree of blurriness of said out-of-focus image relative to said in-focus image by comparing said blur evaluation value with a predetermined reference value, choosing a first mixture ratio set in a case where said blur evaluation value is evaluated to be equal to or more than said reference value, and choosing a second mixture ratio set in a case where said blur evaluation value is evaluated to be less than said reference value, provided that said first mixture ratio set refers to one set having a gradually varying mixture ratio for mixing said in-focus image and said out-of-focus image, and said second mixture ratio set refers to one set having a higher mixture ratio of said in-focus image and a lower mixture ratio of said out-of-focus image than said first mixture ratio set, and a mixed image generator that generates a plurality of mixed images from said in-focus image and said out-of-focus image read out of said recording medium in accordance with a chosen one of said first and second mixture ratio sets;

a display that displays said mixed images; and a display controller that sequentially displays said plurality of mixed images on said display.

15. The still image display system according to claim 14, further configured to perform a function of registering processing to said specific area in said in-focus image and said out-of-focus image.

16. The still image display system according to claim 15, wherein said blur evaluation value is calculated based on said high frequency component included in said specific area in said in-focus image and said out-of-focus image.

17. The still image display system according to claim 14, further configured to calculate said blur evaluation value based on said high frequency component included in said specific area in said in-focus image and said out-of-focus image.

18. A still image display method comprising:

recording an in-focus image and an out-of-focus image obtained by imaging an identical object;

a controller configured to perform the functions of:

reading out said in-focus image and said out-of-focus image from said recording medium, calculating a blur evaluation value based on a difference between high frequency components contained in said in-focus image and said out-of-focus image, evaluating the degree of blurriness of said out-of-focus image relative to said in-focus image by comparing said blur evaluation value with a predetermined reference value, choosing a first mixture ratio set in a case where said blur evaluation value is evaluated to be equal to or more than said reference value, and choosing a second mixture ratio set in a case where said blur evaluation value is evaluated to be less than said reference value, provided that said first mixture ratio set refers to one set having a gradually varying mixture ratio for mixing said in-focus image and said out-of-focus image, and said second mixture ratio set refers to one set having a higher mixture ratio of said in-focus image and a lower mixture ratio of said out-of-focus image than said first mixture ratio set, and generating a plurality of mixed images from said in-focus image and said out-of-focus image read out of said recording medium in accordance with a chosen one of said first and second mixture ratio sets;

displaying said mixed images; and sequentially displaying said plurality of mixed images on said display.

* * * * *